(12) United States Patent
Dunlap et al.

(10) Patent No.: US 12,179,870 B2
(45) Date of Patent: Dec. 31, 2024

(54) SEAT POST ASSEMBLY WITH AN ADJUSTABLE STROKE

(71) Applicant: SRAM, LLC, Chicago, IL (US)

(72) Inventors: Charles Dunlap, Manitou Springs, CO (US); Rafer Chambers, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 130 days.

(21) Appl. No.: 18/169,184

(22) Filed: Feb. 14, 2023

(65) Prior Publication Data

US 2023/0264771 A1     Aug. 24, 2023

Related U.S. Application Data

(60) Provisional application No. 63/311,587, filed on Feb. 18, 2022.

(51) Int. Cl.
*B62J 1/06* (2006.01)
*B62J 1/08* (2006.01)

(52) U.S. Cl.
CPC ............ *B62J 1/06* (2013.01); *B62J 2001/085* (2013.01)

(58) Field of Classification Search
CPC ........... B62J 1/06; B62J 1/10; B62J 2001/085
See application file for complete search history.

(56) References Cited

U.S. PATENT DOCUMENTS

| | | | |
|---|---|---|---|
| 8,926,216 B2* | 1/2015 | McAndrews | B62J 1/08 403/109.7 |
| 9,242,688 B2* | 1/2016 | McAndrews | B62K 25/08 |
| 9,580,123 B2* | 2/2017 | Shirai | B62K 19/36 |
| 10,093,372 B2* | 10/2018 | McAndrews | B62K 19/18 |
| 10,189,522 B2* | 1/2019 | Pittens | B62J 1/08 |
| 10,246,155 B2* | 4/2019 | McAndrews | B62K 19/36 |
| 10,479,431 B2* | 11/2019 | Winefordner | B62J 1/08 |
| 10,549,803 B2* | 2/2020 | Shipman | B62J 1/06 |

(Continued)

FOREIGN PATENT DOCUMENTS

| TW | I676566 | 11/2019 |
|---|---|---|
| TW | 202010674 | 3/2020 |

(Continued)

OTHER PUBLICATIONS

Ed Spratt, TranzX's New Dropper Has Adjustable Travel & An Integrated Seat Post Clamp, Website: https://www.pinkbike.com/news/tranzxs-new-integrated-travel-adjust-dropper-post-will-fit-any-frame.html Last Checked Jan. 10, 2024.

*Primary Examiner* — Rodney B White

(57) ABSTRACT

A seat post assembly for a bicycle includes a first tube having a first distal end, and a second tube having a second distal end. The first tube is movable relative to the second tube to establish a distance between the first distal end and the second distal end. The distance is at a maximum distance when the first tube is in a first position relative to the second tube. The seat post assembly includes a seal disposed within the second tube and connected to the first tube or the second tube. The seat post assembly includes a piston coupled to the seal when the first tube is in the first position. A position of the seal relative to the second distal end is adjustable, such that the first position of the first tube relative to the second tube is adjustable via the coupling between the piston and the seal.

20 Claims, 30 Drawing Sheets

(56) References Cited

U.S. PATENT DOCUMENTS

| | | | |
|---|---|---|---|
| 10,625,800 B2* | 4/2020 | McAndrews | F16B 7/1409 |
| 10,668,968 B2* | 6/2020 | Shipman | B62J 1/08 |
| 10,676,146 B2* | 6/2020 | Hara | B62J 1/08 |
| 10,759,483 B2* | 9/2020 | Hara | B62J 1/08 |
| 10,974,781 B2 | 4/2021 | Staples | |
| 11,066,118 B2 | 6/2021 | Katsuki | |
| 11,077,901 B2* | 8/2021 | Pittens | B62J 1/06 |
| 11,649,002 B2* | 5/2023 | Shipman | B62J 1/08 |
| | | | 297/215.13 |
| 11,661,129 B2* | 5/2023 | Chambers | B62J 1/08 |
| | | | 297/199 |
| 11,724,769 B2* | 8/2023 | Santurbane | B62K 25/30 |
| | | | 280/283 |
| 11,767,073 B2* | 9/2023 | Staples | B62J 1/08 |
| | | | 297/199 |
| 11,780,520 B1* | 10/2023 | Staples | B62J 1/06 |
| | | | 297/199 |
| 11,834,121 B2* | 12/2023 | Staples | B62J 1/08 |
| 11,845,505 B2* | 12/2023 | Shipman | B62K 19/36 |
| 11,987,312 B2* | 5/2024 | Shipman | B62K 19/36 |
| 2004/0232650 A1* | 11/2004 | Felsl | B62K 21/06 |
| | | | 280/283 |
| 2014/0208933 A1* | 7/2014 | Kuo | F16F 9/466 |
| | | | 91/43 |
| 2016/0355225 A1* | 12/2016 | Shirai | B62J 1/06 |
| 2017/0274949 A1* | 9/2017 | Pittens | B62J 1/08 |
| 2019/0002050 A1* | 1/2019 | Shipman | B62J 1/08 |
| 2019/0002051 A1* | 1/2019 | Shipman | B62J 1/08 |
| 2020/0140029 A1* | 5/2020 | Shipman | B62J 1/08 |
| 2021/0094642 A1 | 4/2021 | Dubois et al. | |
| 2021/0403111 A1* | 12/2021 | Chambers | B62J 1/06 |
| 2023/0322318 A1* | 10/2023 | Staples | B62K 19/36 |
| 2024/0166286 A1* | 5/2024 | Chambers | B62J 1/08 |

FOREIGN PATENT DOCUMENTS

| | | |
|---|---|---|
| TW | 202023882 | 7/2020 |
| TW | I714823 | 1/2021 |

\* cited by examiner

View A

SEAT POST ASSEMBLY WITH AN ADJUSTABLE STROKE

PRIORITY

This application claims the benefit of U.S. Provisional Patent Application No. 63/311,587, filed on Feb. 18, 2022, which is hereby incorporated by reference in its entirety.

BACKGROUND

1. Field of the Disclosure

The present disclosure is generally directed to a seat post assembly for a bicycle, and more particularly, to a seat post assembly with an adjustable stroke.

2. Description of Related Art

Bicycles are known to have a seat or saddle to support a rider in a seated position. The position of the saddle on most bicycles is adjustable in some manner. The saddle may be adjustable so that a given bicycle may be configured to accommodate different riders of various sizes. The saddle may also be adjustable to allow a given rider to set or reset the saddle position on a specific bicycle to accommodate different riding conditions.

In one example, a bicycle may have a height adjustable seat post assembly. Thus, the height of the saddle may be selectively adjusted relative to a frame of the bicycle. The typical bicycle has a saddle mounted to a post that is mechanically clamped to a tube of the bicycle frame. When the clamp is released, the saddle and post are slidable up and down relative to the tube of the bicycle frame to adjust the height of the saddle.

On more recent higher end bicycles, however, the seat post is height adjustable during riding of the bicycle by employing some type of hydraulic assist mechanism. For example, manually actuated hydraulic height adjustable or "dropper" seat posts may use a hydraulic pressure differential within the post, and manual operation may adjust the seat post height. Some products may use ANT+ wireless communication technology allowing the rider to wirelessly adjust the saddle height.

Dropper seat posts have a fixed stroke range set by internal components. A maximum dropper post insertion into a bicycle frame is limited by a dropper seat post collar or internal bicycle frame features. A saddle is connected to an upper tube of the dropper post. When the dropper seat post is fully inserted into the bicycle frame, an upper tube top-of-stroke position may place the saddle too high for some riders to properly pedal the bicycle.

SUMMARY

In one example, a seat post assembly for a bicycle includes a first tube having a first distal end, and a second tube having a second distal end. The first tube is movable relative to the second tube to establish a distance between the first distal end of the first tube and the second distal end of the second tube along a tube axis. The distance between the first distal end of the first tube and the second distal end of the second tube is at a maximum distance when the first tube is in a first position relative to the second tube, and the distance between the first distal end of the first tube and the second distal end of the second tube is at a minimum when the first tube is in a second position relative to the second tube. The seat post assembly also includes a seal disposed within the second tube. The seal is connected to the first tube or the second tube. The seat post assembly also includes a piston that is coupled to the seal when the first tube is in the first position relative to the second tube. A position of the seal relative to the second distal end of the second tube is adjustable, such that the first position of the first tube relative to the second tube is adjustable via the coupling between the piston and the seal.

In one example, the seat post assembly also includes an actuator configured to adjust the position of the seal relative to the second distal end of the second tube.

In one example, the seal is a seal head. The seal head is connected to and positionally fixed relative to the first tube.

In one example, the actuator includes an endcap configured to at least partially seal the second distal end of the second tube. The endcap is rotatable and translatable relative to the second tube via a threaded connection of the endcap to the second tube.

In one example, the piston includes a piston head and a piston shaft. The piston shaft extends through the seal head and connects the piston head to the endcap, such that the endcap and the piston head are on opposite sides of the seal head. The endcap and the piston head are configured to rotate and translate together.

In one example, the piston is coupled to the seal when the first tube is in the first position relative to the second tube via contact between a surface of the piston head and a surface of the seal head. The seat post assembly further includes a bumper disposed between the piston head and the seal head, and the piston is coupled to the seal when the first tube is in the first position relative to the second tube via the bumper, such that the seal head and the piston head are in contact with opposite sides of the bumper, respectively.

In one example, when the first tube is in the first position relative to the second tube, the endcap and the piston are rotatable relative to the second tube via the threaded connection in a first rotational direction, such that the endcap and the piston translate in a first translational direction and, via the coupling of the piston to the seal, the seal and the first distal end of the first tube translate towards the second distal end of the second tube. The translation of the first distal end of the first tube towards the second distal end of the second tube adjusts the first position of the first tube relative to the second tube, such that the maximum distance between the first distal end of the first tube and the second distal end of the second tube decreases.

In one example, when the first tube is in the first position relative to the second tube, the endcap and the piston are rotatable relative to the second tube via the threaded connection in a second rotational direction, such that the endcap and the piston translate in a second translational direction and, via the coupling of the piston to the seal, the seal and the first distal end of the first tube are allowed to translate away from the second distal end of the second tube. The second rotational direction is opposite the first rotational direction, and the second translational direction is opposite the first translational direction. The translation of the first distal end of the first tube away from the second distal end of the second tube adjusts the first position of the first tube relative to the second tube, such that the maximum distance between the first distal end of the first tube and the second distal end of the second tube increases.

In one example, the seat post assembly further includes one or more first anti-rotation features of the first tube and one or more second anti-rotation features of the second tube. The one or more first anti-rotation features and the one or more second anti-rotation features are configured to interact with each other, respectively, such that the first tube is translatable but not rotatable relative to the second tube.

In one example, the seal is a seal head, the seal head being rotatable and translatable relative to the second tube via a threaded connection of the seal head to the second tube.

In one example, the seat post assembly further includes a seatpost head to which a seat is attachable. The seatpost head is configured to at least partially seal the first distal end of the first tube. The seatpost head is positionally fixed relative to the first tube.

In one example, the piston includes a piston head and a piston shaft. The piston shaft extends through the seal head and connects the piston head to the seatpost head, such that the seatpost head and the piston head are on opposite sides of the seal head. The piston is positionally fixed relative to the first tube and the seatpost head.

In one example, the actuator includes a gear supported by the second tube. The gear is configured to interact with an outer surface of the seal head, such that rotation of the gear relative to the second tube causes, via the interaction of the gear with the outer surface of the seal head, rotation and translation of the seal head relative to the second tube via the threaded connection.

In one example, the outer surface of the seal head includes pinion gear teeth, and the gear is a worm gear configured to interact with the pinion gear teeth of the seal head.

In one example, the second tube has an opening through a wall of the second tube. the worm gear has a shaft that extends through the opening through the wall of the second tube, such that the worm gear is rotatable from outside the second tube.

In one example, when the first tube is in the first position relative to the second tube, the gear is rotatable relative to the second tube in a first rotational direction, such that, via the interaction of the gear with the outer surface of the seal head, the seal head translates in a first translational direction relative to the second tube and, via the coupling of the piston to the seal, the first distal end of the first tube translates towards the second distal end of the second tube. The translation of the first distal end of the first tube towards the second distal end of the second tube adjusts the first position of the first tube relative to the second tube, such that the maximum distance between the first distal end of the first tube and the second distal end of the second tube decreases.

In one example, a seat post assembly for a bicycle includes a first tube having a first distal end, and a second tube having a second distal end. The first tube is movable relative to the second tube to establish a distance between the first distal end of the first tube and the second distal end of the second tube along a tube axis. The distance between the first distal end of the first tube and the second distal end of the second tube is at a maximum distance when the first tube is in a first position relative to the second tube, and the distance between the first distal end of the first tube and the second distal end of the second tube is at a minimum when the first tube is in a second position relative to the second tube. The seat post assembly also includes a seal disposed within the second tube. The seal is connected to the first tube or the second tube. The seat post assembly also includes a piston that is coupled to the seal when the first tube is in the first position relative to the second tube, and an actuator supported by and rotatable relative to the second tube. The actuator is configured to adjust a position of the seal relative to the second distal end of the second tube, such that the first position of the first tube relative to the second tube is adjustable via the coupling between the piston and the seal.

In one example, the actuator includes an endcap configured to at least partially seal the second distal end of the second tube. The endcap is rotatable and translatable relative to the second tube via a threaded connection of the endcap to the second tube. The piston includes a piston head and a piston shaft. The piston shaft extends through the seal and connects the piston head to the endcap, such that the endcap and the piston head are on opposite sides of the seal, and the endcap and the piston head rotate and translate together. When the first tube is in the first position relative to the second tube, the endcap and the piston are rotatable relative to the second tube via the threaded connection in a first rotational direction, such that the endcap and the piston translate in a first translational direction and, via the coupling of the piston to the seal, the first distal end of the first tube translates towards the second distal end of the second tube. The translation of the first distal end of the first tube towards the second distal end of the second tube adjusts the first position of the first tube relative to the second tube, such that the maximum distance between the first distal end of the first tube and the second distal end of the second tube decreases.

In one example, the seal is rotatable and translatable relative to the second tube via a threaded connection of the seal to the second tube. The seat post assembly further includes a seatpost head configured to at least partially seal the first distal end of the first tube. The seatpost head is positionally fixed relative to the first tube. The piston includes a piston head and a piston shaft. The piston shaft extends through the seal and connects the piston head to the seatpost head, such that the seatpost head and the piston head are on opposite sides of the seal. The piston is positionally fixed relative to the first tube and the seatpost head. The actuator includes a gear supported by the second tube. The gear is configured to interact with an outer surface of the seal, such that rotation of the gear relative to the second tube causes, via the interaction of the gear with the outer surface of the seal, rotation and translation of the seal relative to the second tube via the threaded connection. When the first tube is in the first position relative to the second tube, the gear is rotatable relative to the second tube in a first rotational direction, such that, via the interaction of the gear with the outer surface of the seal, the seal translates in a first translational direction relative to the second tube and, via the coupling of the piston to the seal, the first distal end of the first tube translates towards the second distal end of the second tube. The translation of the first distal end of the first tube towards the second distal end of the second tube adjusts the first position of the first tube relative to the second tube, such that the maximum distance between the first distal end of the first tube and the second distal end of the second tube decreases.

In one example, a seat post assembly for a bicycle includes a first tube having a first distal end, and a second tube having a second distal end. The first tube is movable relative to the second tube to establish a distance between the first distal end of the first tube and the second distal end of the second tube along a tube axis. The distance between the first distal end of the first tube and the second distal end of the second tube is at a maximum distance when the first tube is in a first position relative to the second tube, and the distance between the first distal end of the first tube and the second distal end of the second tube is at a minimum when the first tube is in a second position relative to the second tube. The seat post assembly also includes a seal disposed within the second tube. The seal is connected to the first tube. The seat post assembly also includes a piston that is coupled to the seal when the first tube is in the first position relative to the second tube. The piston includes a piston head and a piston shaft. The seat post assembly also includes an actuator including an endcap configured to at least partially seal the second distal end of the second tube. The endcap is rotatable and translatable relative to the second tube via a threaded connection of the endcap to the second tube. The piston shaft extends through the seal and connects the piston head to the endcap, such that the endcap and the piston head are on opposite sides of the seal, and the endcap and the piston head rotate and translate together. When the first tube is in the first position relative to the second tube, the endcap and the piston are rotatable relative to the second tube via the threaded connection in a first rotational direction, such that the endcap and the piston translate in a first translational direction and, via the coupling of the piston to the seal, the first distal end of the first tube translates towards the second distal end of the second tube. The translation of the first distal end of the first tube towards the second distal end of the second tube adjusts the first position of the first tube relative to the second tube, such that the maximum distance between the first distal end of the first tube and the second distal end of the second tube decreases.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
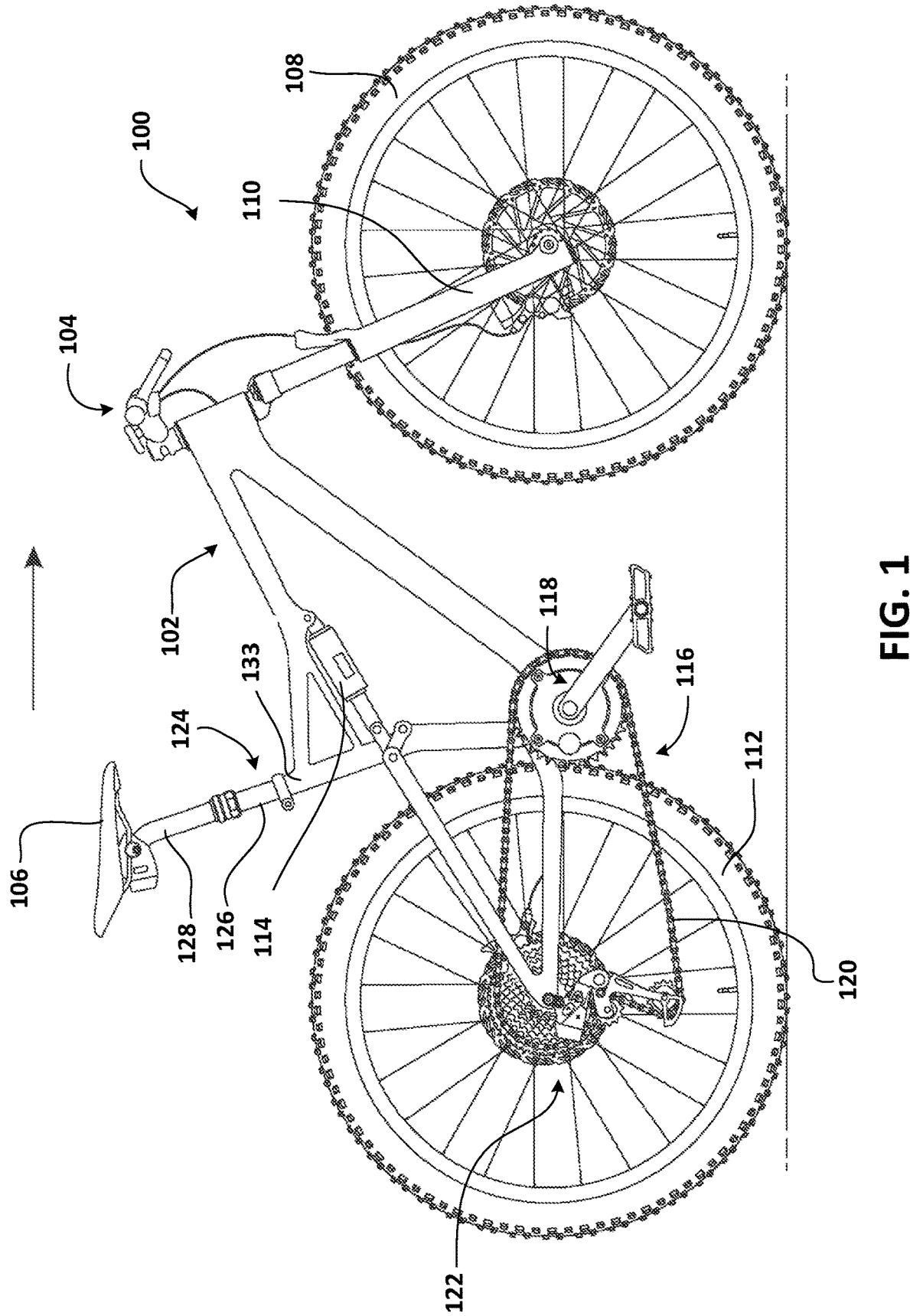
FIG. 1 is a side view of one example of a bicycle that may be fitted with a seat post assembly constructed in accordance with the teachings of this disclosure.

The present disclosure provides examples of seat post assemblies that solve or improve upon one or more of the above-noted and/or other disadvantages with prior known seat post assemblies. The disclosed seat post assemblies provide an adjustable stroke feature, such that a top out height of the seat post is adjustable when a bicycle frame seat tube is too tall for the seat post to fit a rider of the bicycle.

Stroke adjustment is provided by rotation of a part of the seat post assembly that simultaneously adjusts a maximum top out position of a saddle attachment of the seat post assembly. In a first example, the seat post assembly includes a rod, a piston, and an actuator assembly. The rod connects the piston to the actuator assembly at a lower end of a lower tube of the seat post assembly. A majority of the rod is housed within the lower tube, and the actuator assembly is attached to the lower tube with, for example, threads. An axial top out position of the actuator assembly relative to the lower tube is adjustable via the threads, which then changes a distance between the piston and the lower end of the lower tube. Changing this distance changes an axial position of an upper tube of the seat post assembly relative to the lower tube, and thus changes the maximum top out position of the saddle attachment.

In a second example, the seat post assembly includes a seal head, and the rod connects the seal head to a top end of the upper tube. A majority of the rod is housed within the upper tube. The seal head is attached to the lower tube with, for example, threads. An axial position of the seal head relative to the lower tube is adjustable via the threads using, for example, a worm gear, which changes a distance between the piston and the lower end of the lower tube. Changing this distance changes the axial position of the upper tube relative to the lower tube, and thus changes the maximum top out position of the saddle attachment.

A significant advantage of the disclosed seat post assemblies is a simple and reliable seat post top out height adjustment that does not require specialty tools. The disclosed seat post assemblies eliminate the additional parts, partial disassembly, or complex fluid valving needed to provide seat post top out height adjustment of the prior art.

These and other objects, features, and advantages of the disclosed seat post assemblies will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 illustrates one example of a bicycle 100 on which the disclosed seat post assembly may be implemented. In this example, the bicycle 100 is a mountain bicycle. The bicycle 100 has a frame 102, handlebars 104 near a front end of the frame 102, and a seat or saddle 106 for supporting a rider over a top of the frame 102. The bicycle 100 also has a first or front wheel 108 carried by a front fork 110 of the frame 102 and supporting the front end of the frame 102. The bicycle 100 also has a second or rear wheel 112 supporting a rear end of the frame 102. The rear end of the frame 102 may be supported by a rear suspension component 114. The bicycle 100 also has a drive train 116 with a crank assembly 118 that is operatively coupled via a chain 120 to a rear cassette 122 near a rotation axis of the rear wheel 112. In this example, the saddle 106 is supported on a seat post assembly 124 constructed in accordance with the teachings of the present disclosure.

While the bicycle 100 depicted in FIG. 1 is a mountain bicycle, the seat post assembly 124, including the specific embodiments and examples disclosed herein as well as alternative embodiments and examples, may be implemented on other types of bicycles. For example, the disclosed seat post assembly 124 may be used on road bicycles, as well as bicycles with mechanical (e.g., cable, hydraulic, pneumatic, etc.) and non-mechanical (e.g., wired, wireless) drive systems. The disclosed seat post assembly 124 may also be implemented on other types of two-, three-, and four-wheeled human powered vehicles.

Figure 2:
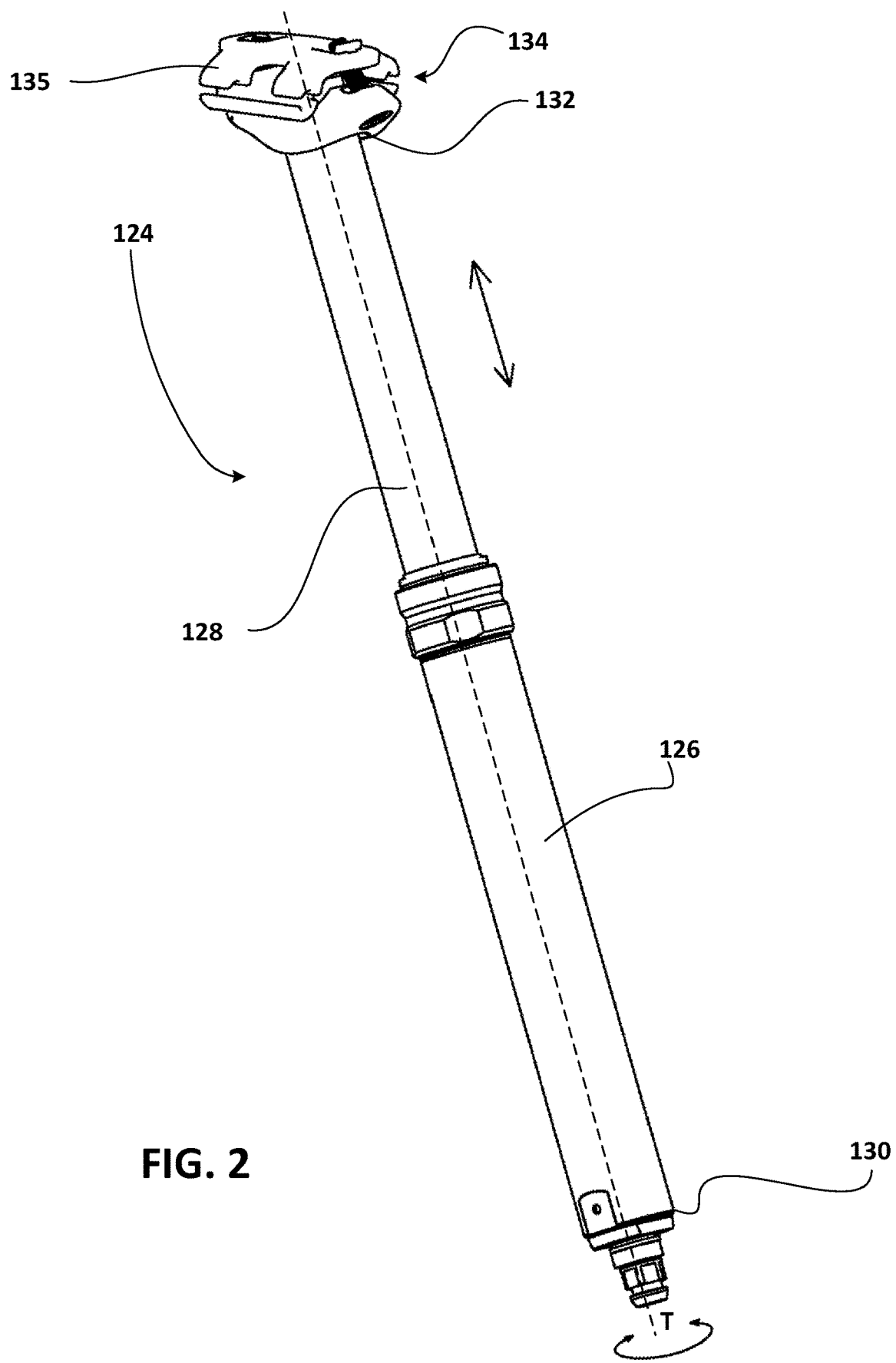
FIG. 2 is a perspective view of a first seat post assembly constructed in accordance with the teachings of this disclosure.

FIGS. 2-23 show a first embodiment of the seat post assembly 124. Referring to FIG. 2, the saddle 106 is attachable to and carried on the top of the seat post assembly 124. The disclosed seat post assembly 124 has a lower post segment (e.g., a lower tube 126) and an upper post segment (e.g., an upper tube 128). The upper tube 128 (e.g., a first tube) and the lower tube 126 (e.g., a second tube) are movable relative to one another to establish a height of the saddle 106 relative to the frame 102. In this example, the lower tube 126 has a lower distal end 130 defining a lower end of the seat post assembly 124. The upper tube 128 has an upper distal end 132 (e.g., a first distal end) defining an upper end of the seat post assembly 124. In one example, the lower distal end 130 (e.g., a second distal end) may be received in and clamped or otherwise secured in a frame tube 133 (see FIG. 1) of the frame 102 in a conventional manner. Thus, the lower tube 126 may be fixed relative to the frame 102 during use, and the upper tube 128 may be slidably and telescopically received in or on the lower tube 126. The upper tube 128 may slide telescopically along a tube axis T relative to the lower tube 126 to establish a distance between the first distal end 132 and the second distal end 130, respectively.

Figure 3:
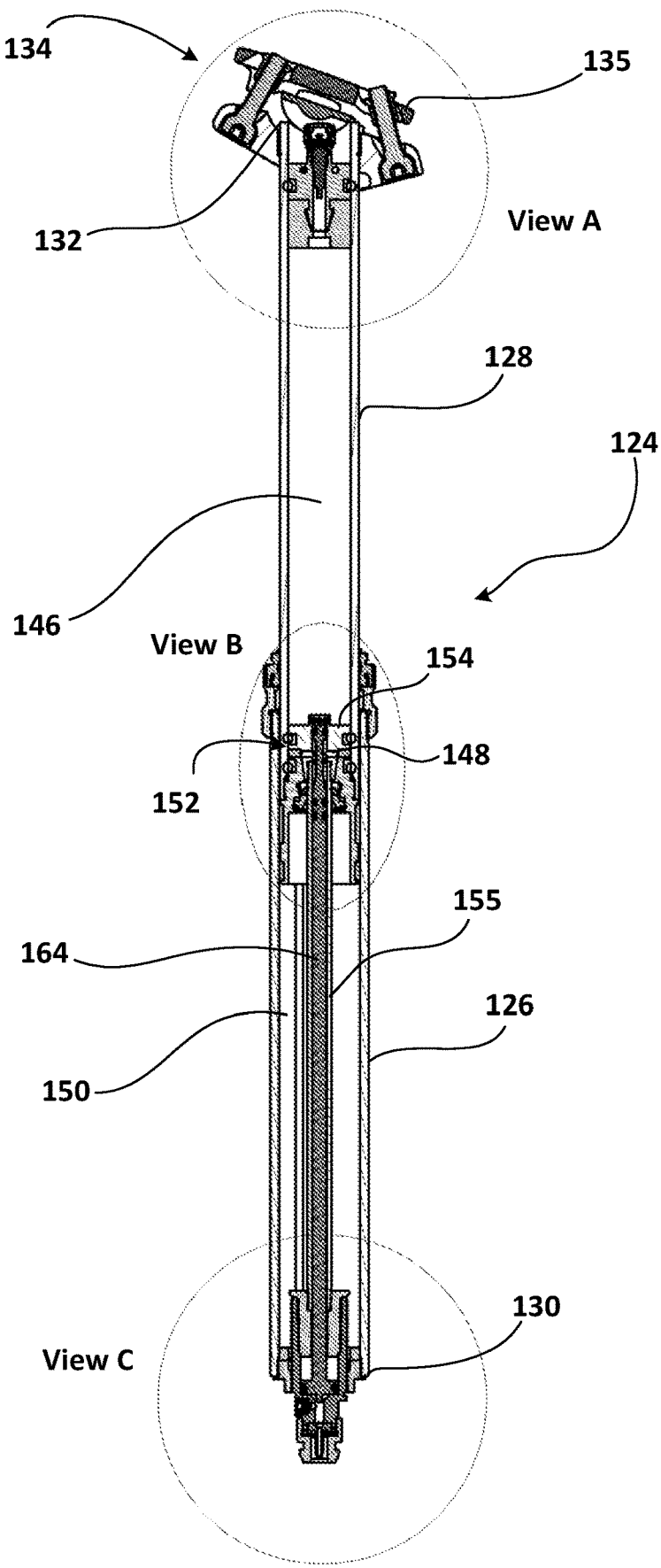
FIG. 3 is a side cross-section of the first seat post assembly of FIG. 2.
Figure 4:
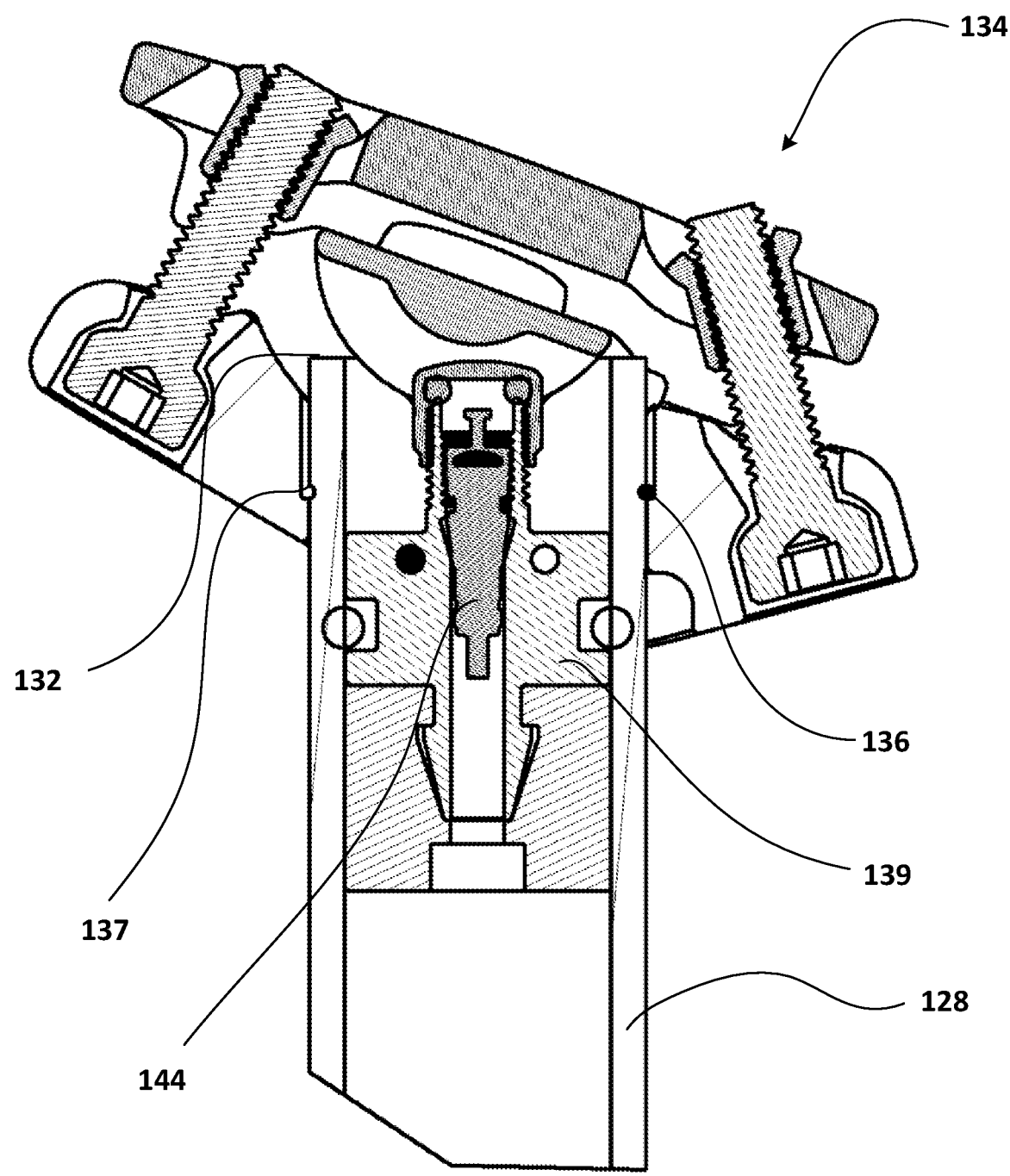
FIG. 4 is close-up view A of the side cross-section of the first seat post assembly of FIG. 3.

Referring to FIGS. 2-4, a head 134 is fixed to the top of the seat post assembly 124 (e.g., to the first distal end 132 of the upper tube 128). The saddle 106 is mountable to and carried on the head 134 to attach the saddle 106 to the seat post assembly 124. In one embodiment, the head 134 includes a saddle clamp assembly or mechanism 135 (e.g., a saddle clamp mechanism) that provides saddle fore-aft and tilt adjustment features. A position (e.g., fore-aft and tilt) of the saddle 106 relative to, for example, the upper tube 128 may be fixed in any number of ways including, for example, with one or more connectors (e.g., saddle clamp bolts) of the saddle clamp mechanism. In one embodiment, the head 134 is configured to include an electronics module that provides functions for the seat height adjustment feature of the disclosed seat post assembly 124.

How the height of the seat post assembly 124 is adjusted is now described below. Referring to FIG. 4, the first distal end 132 of the upper tube 128 (e.g., a first end 132 of the upper tube 128) is attached to the head 134 in any number of ways. For example, the first distal end 132 of the upper tube 128 is press fit into an opening in the head 134, and an extension 136 of the head 134 or retained within the head 134 moves into a groove 137 adjacent to the first distal end 132 of the upper tube 128 as the first distal end 132 of the upper tube 128 moves into the opening in the head 134. For example, the extension 136 may be a ring lock positioned within the opening in the head 134 that locks the head 134 to the upper tube 128.

The first distal end 132 of the upper tube 128 may be attached to the head 134 in other ways. For example, the first distal end 132 of the upper tube 128 is threaded onto a boss 139 of the head 134 that protrudes from a bottom of the head 134. The boss 139 may be integral with the head 134 or may be a separate part attached (e.g., threadedly attached) to the head 134. Alternatively or additionally, connectors such as, for example, screws, bolts, flanges, tabs, and/or other connectors may be used to attach the first distal end 132 of the upper tube 128 to the head 134.

Figure 5:
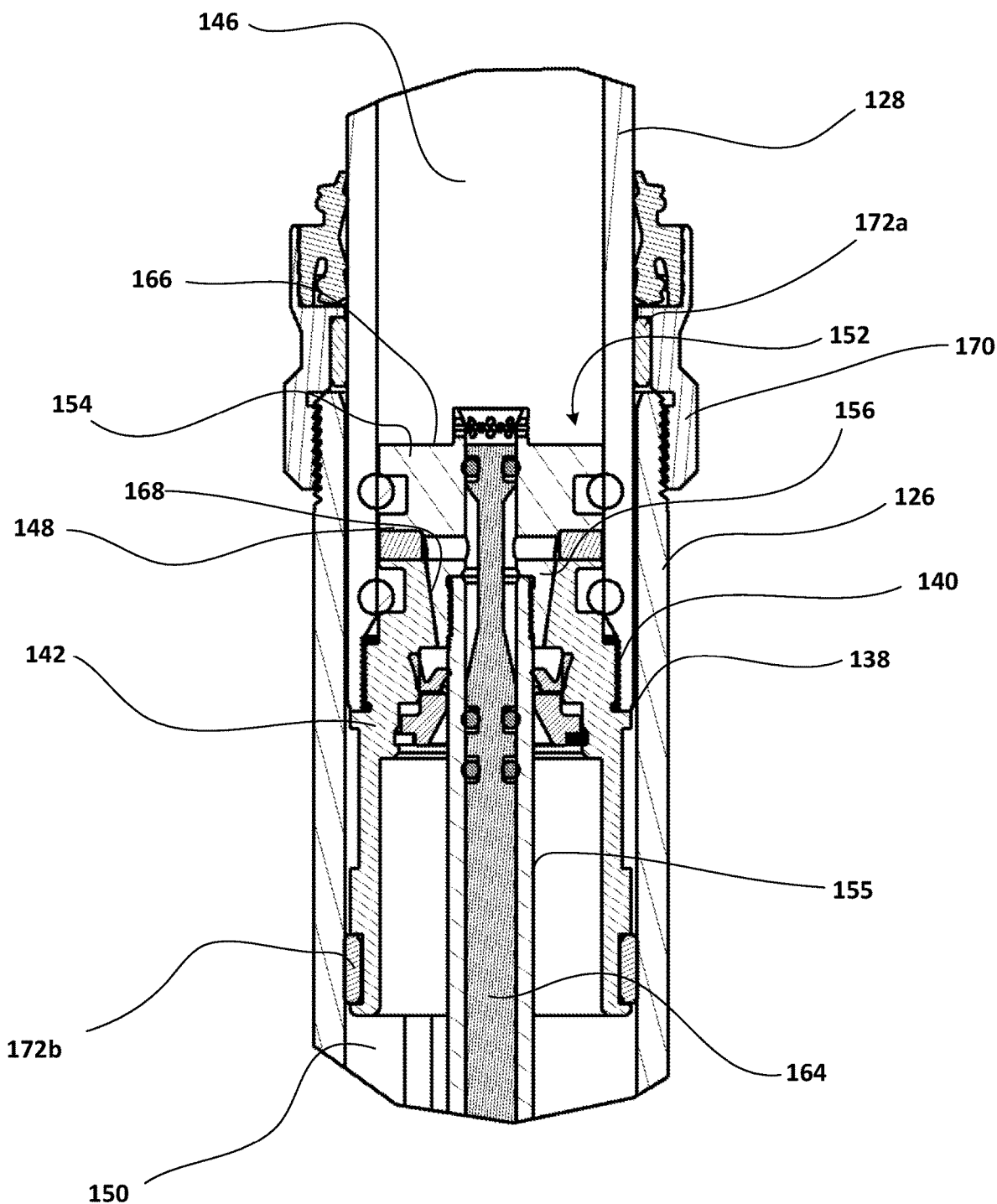
FIG. 5 is close-up view B of the side cross-section of the first seat post assembly of FIG. 3.

Referring to FIG. 5, a second end 138 of the upper tube 128, which is opposite the first end 132 of the upper tube 128, is threaded onto an outer portion 140 (e.g., a threaded outer portion) of a seal head 142. The upper tube 128 may be sealed from a surrounding environment (e.g., when valves are closed) with the boss 139 of the head 134 and the seal head 142.

The seat post assembly 124 has a pressure system (e.g., a pneumatic pressure system). A compressible fluid or gas, such as air, is contained within a fluid volume of the pneumatic pressure system. In one embodiment, the fluid volume includes the compressible fluid or gas and an incompressible fluid. In such an embodiment, the fluid volume may be majority or primarily (e.g., greater than 80 percent by volume) compressible fluid or gas. In another embodiment, the fluid volume includes at least a majority incompressible fluid.

The fluid volume of the pneumatic pressure system includes multiple pneumatic chambers (e.g., volumes). Referring to FIG. 4, the pneumatic pressure system in this example is pressurized with air via a valve 144 (e.g., a fill valve such as a Shrader valve) in the head 134, at the first distal end 132 of the upper tube 128. In one example, the pneumatic pressure system may initially be pressurized to a preset or established pressure (e.g., with the seat post assembly 124 in a fully extended position). The pneumatic pressure system may be pressurized such that when the seat post assembly 124 is in a fully contracted position and relative movement between the upper tube 128 and the lower tube 126 is allowed, the pneumatic pressure system causes the upper tube 128 to move relative to the lower tube 126, towards the fully extended position.

Referring to FIG. 3, the pressurized medium, such as air, is contained within the multiple pneumatic chambers, which include at least a first pneumatic chamber 146, a second pneumatic chamber 148, and a third pneumatic chamber 150 in this example. The first pneumatic chamber 146 is, for example, a positive pressure chamber, the second pneumatic chamber 148 is a negative pressure chamber, and the third pneumatic chamber 150 is a residual pressure chamber. The first pneumatic chamber 146, the second pneumatic chamber 148, and the third pneumatic chamber 150 are pressure sealed chambers. The pressurized medium may be added to the pneumatic pressure system such that at least the first pneumatic chamber 146 and the third pneumatic chamber 150 are each pressurized at a respective predetermined or preset pressure.

The first pneumatic chamber 146, the second pneumatic chamber 148, and the third pneumatic chamber 150 may be any number of shapes and/or sizes. For example, the first pneumatic chamber 146, the second pneumatic chamber 148, and the third pneumatic chamber 150 may be cylindrically shaped (e.g., with outer diameters between 27 mm and 35 mm, respectively) and may be sized for a particular maximum post adjustment (e.g., 150 mm).

Figure 6:
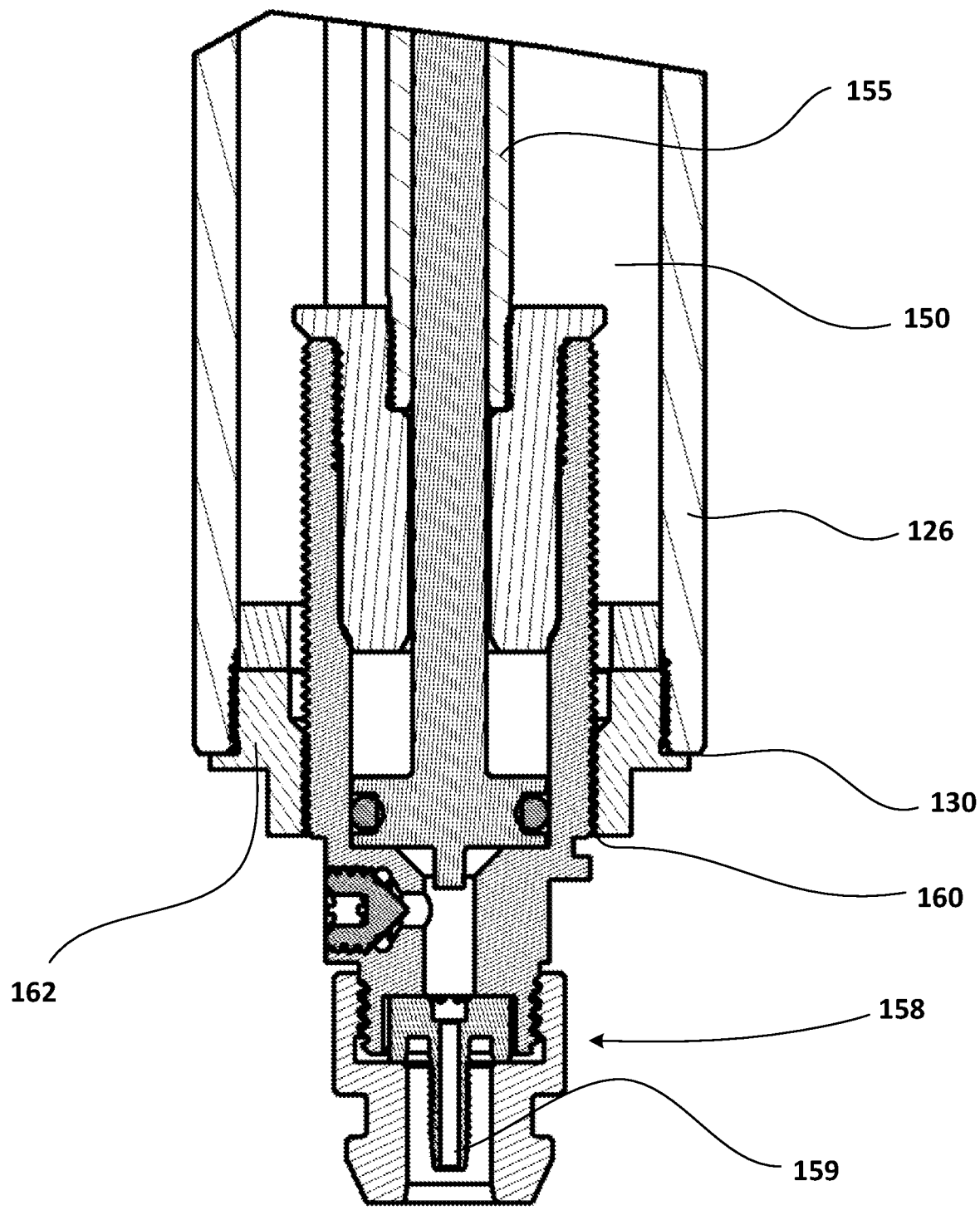
FIG. 6 is close-up view C of the side cross-section of the first seat post assembly of FIG. 3.

Referring to FIG. 5, a portion of a piston 152 (e.g., a piston head 154) is received within an interior of the upper tube 128. The piston head 154 is disposed at an upper end of the piston 152. A piston shaft 155 is threadably connected to a stem 156 that protrudes from the piston head 154 in a direction away from the head 134. The piston shaft 155 extends through the seal head 142. Referring to FIG. 6, an end cap 158 is threaded into or onto a lower end of the piston shaft 155. The end cap 158 may include, for example, a valve 159 (e.g., a vent and fill valve). The vent and fill valve 159 may be used to vent and/or add fluid (e.g., gas; air) to, for example, the third pneumatic chamber 150.

The end cap 158 is attached to the lower tube 126 via a step or shoulder 162 attached (e.g., threadedly fixed) to the lower tube 126 at the second distal end 130 of the lower tube 126. The step or shoulder 162 (e.g., a lock ring) forms a bore 160 through which part of the end cap 158 extends. In one embodiment, a retaining ring prevents a portion of the end cap 158 (e.g., the portion including the vent and fill valve 159) from being disposed within the lower tube 126.

Referring to FIG. 3, the first pneumatic chamber 146 includes a volume within the upper tube 128, between the head 134 and the piston head 154 of the piston 152 (e.g., a side of the piston head 154 facing the head 134). The second pneumatic chamber 148 includes a volume within the upper tube 128, between the seal head 142 and the piston head 154 of the piston 152 (e.g., a side of the piston head 154 facing away from the head 134 and towards the end cap 158). In other words, the first pneumatic chamber 146 and the second pneumatic chamber 148 are disposed within the upper tube 128 and separated by the piston head 154 of the piston 152. The third pneumatic chamber 150 includes a volume within the lower tube 126, around the piston shaft 155, and between the seal head 142 and the end cap 158 received in the bore 160 of the lower tube 126.

Referring to FIG. 5, the piston 152 includes a valve 164 (e.g., an actuator valve with an isolator; a poppet) that is disposed within the piston head 154 and the piston shaft 155.

A portion of the actuator valve 164 (e.g., the isolator) is movable relative to the piston head 154 and the piston shaft 155 between an open position and a closed position. The first pneumatic chamber 146 and the second pneumatic chamber 148 are fluidly coupleable via the actuator valve 164. For example, the first pneumatic chamber 146 and the second pneumatic chamber 148 are fluidly coupled when the actuator valve 164 is open, and the first pneumatic chamber 146 and the second pneumatic chamber 148 are not fluidly coupled when the actuator valve 164 is closed.

The piston head 154 of the piston 152 has a first side 166 that faces the head 134, and a second side 168 opposite the first side 166. The second side 168 of the piston head 154 faces in a direction towards the seal head 142. In other words, the first side 166 of the piston head 154 partially forms the first pneumatic chamber 146, and the second side 168 of the piston head 154 partially forms the second pneumatic chamber 148. The volume of the first pneumatic chamber 146 and the volume of the second pneumatic chamber 148 are based on a position of the piston head 154 of the piston 152 relative to the upper tube 128.

The first side 166 and the second side 168 of the piston head 154 are sized and shaped, and the first pneumatic chamber 146 and the second pneumatic chamber 148 are respectively pressurized when the seat post assembly 124 is in the fully extended position, such that the fluid (e.g., air) within the first pneumatic chamber 146 supports the rider. The saddle 106 may sag less than 10 mm as a result of the weight of the rider on the saddle 106 when the seat post assembly is in the fully extended position.

The seat post assembly 124 operates because the axial surface area of the first side 166 of the piston head 154 versus a pneumatic pressure ratio between the first pneumatic chamber 146 and the second pneumatic chamber 148 holds up the rider based on the force calculation. This is also dependent on the volume of the second pneumatic chamber 148 at the fully extended position of the seat post assembly 124.

A length of the first pneumatic chamber 146 when the seat post assembly 124 is in the fully extended position, an inner diameter of the upper tube 128, and/or a size and/or shape of the second pneumatic chamber 148 may be configured, such that a percentage of the volume of the second pneumatic chamber 148 relative to the volume of the first pneumatic chamber 146, in the fully extended position, is less than, for example, ten percent, five percent, three percent, or one percent (e.g., 0.98%). This makes the seat post assembly 124 act like a zero negative pressure preloaded pneumatic spring. This is the principal that holds up the rider with a feel the rider experiences as being rigid. At the fully extended position of the seat post assembly 124, the saddle 106 may be moving, but this movement is not perceivable to the rider.

When a rider is not seated on the saddle 106 and the actuator valve 164 is open, the balance of forces in the system is such that the axial pressure force acting on the first side 166 of the piston head 154 is greater than the axial pressure force acting on the second side 168 of the piston head 154. In the open position, the isolator of the actuator valve 164, for example, is positioned such that fluid may flow through the flow path between the first pneumatic chamber 146 and the second pneumatic chamber 148. The axial pressure force imbalance biases the seat post assembly 124 towards the fully extended position.

When a force is applied to the first distal end 132 of the upper tube 128 (e.g., via the saddle 106), air, for example, is forced out of the first pneumatic chamber 146 and into the second pneumatic chamber 148, and the head 134 and the upper tube 128, along with all other parts fixed to the head 134 and the upper tube 128, are pushed downward to accommodate the resulting increase in fluid volume in the second pneumatic chamber 148. With the applied force, the rider may lower the saddle 106 and the upper tube 128 to the fully contracted position (see, e.g., FIG. 10) or, if desired, may adjust the saddle 106 to a lesser intermediate height (see, e.g., FIG. 9).

The actuator valve 164 may be closed at the desired position of the upper tube 128 relative to the lower tube 126 to prevent or limit further relative motion between the upper tube 128 and the lower tube 126. When the actuator valve 164 is closed, the balance of forces in the system is such that the axial pressure force acting on the first side 166 of the piston head 154 is approximately equal to the axial pressure force acting on the second side 168 of the piston head 154. When the seat post assembly 124 is in an intermediate position, the saddle 106 may sag as a result of the weight of the rider, but this sag may be 30 mm or less.

As shown in FIG. 5, the seat post assembly 124 includes additional components that facilitate proper relative motion of the upper tube 128 relative to the lower tube 126 of the seat post assembly 124. A collar 170 is threadably connected to the upper end of the lower tube 126 and closely surrounds the upper tube 128. The lower tube 126 and the collar 170 are essentially fixed relative to one another and thus are constrained to not move relative to each other. Since the lower tube 126 is clamped in the frame tube 133 of the bicycle frame 102, these components will always be in the same fixed position relative to the bicycle frame 102. The head 134 and the upper tube 128 are fixed to one another and thus are constrained to always move together as a unit. These parts telescope vertically within and relative to the lower tube 126 along the tube axis.

The seat post assembly 124 also includes one or more bushings 172 to facilitate the relative motion between the upper tube 128 and the lower tube 126. For example, the collar 170 includes a first bushing 172a, and the seal head 142 includes a second bushing 172b. The first bushing 172a and the second bushing 172b, for example, reduce friction between the upper tube 128 and the lower tube 126 during relative movement. An inner annular surface of the first bushing 172a slides along an outer annular surface of the upper tube 128, and an outer annular surface of the second bushing 172b slides long an inner annular surface of the lower tube 126. The seat post assembly 124 may include more, fewer, and/or different bushings.

Figure 7:
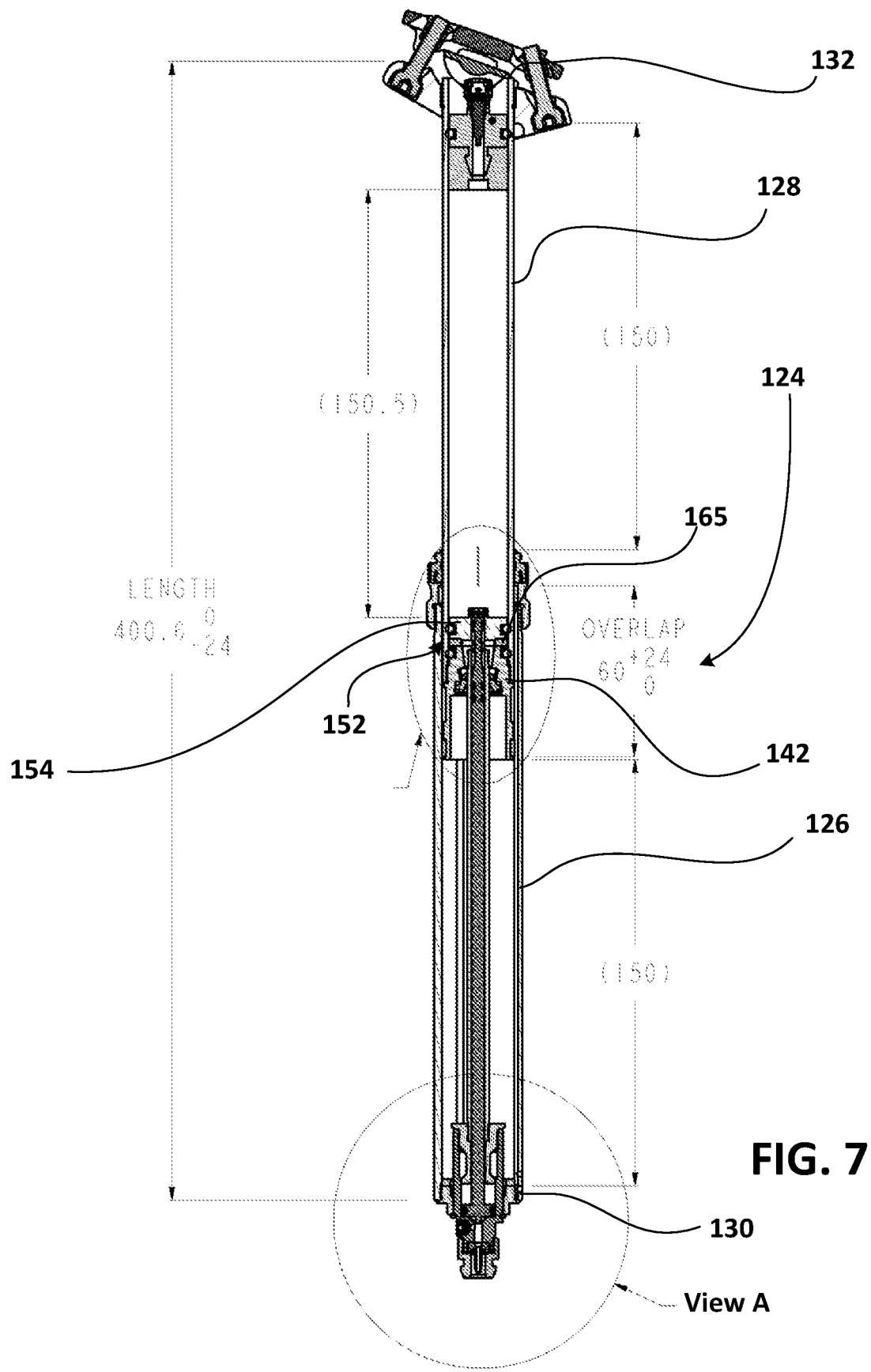
FIG. 7 is a side cross-section of the first seat post assembly, in a first fully extended position.

Referring to FIG. 7, the seat post assembly 124 may be positioned in a fully extended position with the upper tube 128 extended upward relative to the lower tube 126 to a fullest extent. The distance between the first distal end 132 of the upper tube 128 and the second distal end 130 of the lower tube 126 may be at a maximum (e.g., the fully extended position) when the upper tube 128 is in a first position relative to the lower tube 126.

The top out height shown in FIG. 7 may be a maximum seat post height of the seat post assembly 124. In other words, FIG. 7 shows a top out height of the seat post assembly 124 without any adjustment of the stroke of the seat post assembly 124, which is described below. The maximum seat post height of the seat post assembly 124 shown in FIG. 7 is 400.6 mm, and a length of the stroke of the piston head 154 is 150.5 mm. In other embodiments, the maximum seat post height and/or the stroke of the piston head 154 may be greater or lesser. For example, the maximum seat post height may be 350 mm or 425 mm.

The fully extended position of the seat post assembly 124 may also correspond to the top out position where the piston head 154 is in contact with (e.g., abuts) the seal head 142. The seal head 142 may include a stop 165 (e.g., a bumper) made of a flexible material (e.g., rubber) against which the piston head 154 abuts when the seat post assembly 124 is in the top out position.

Figure 10:
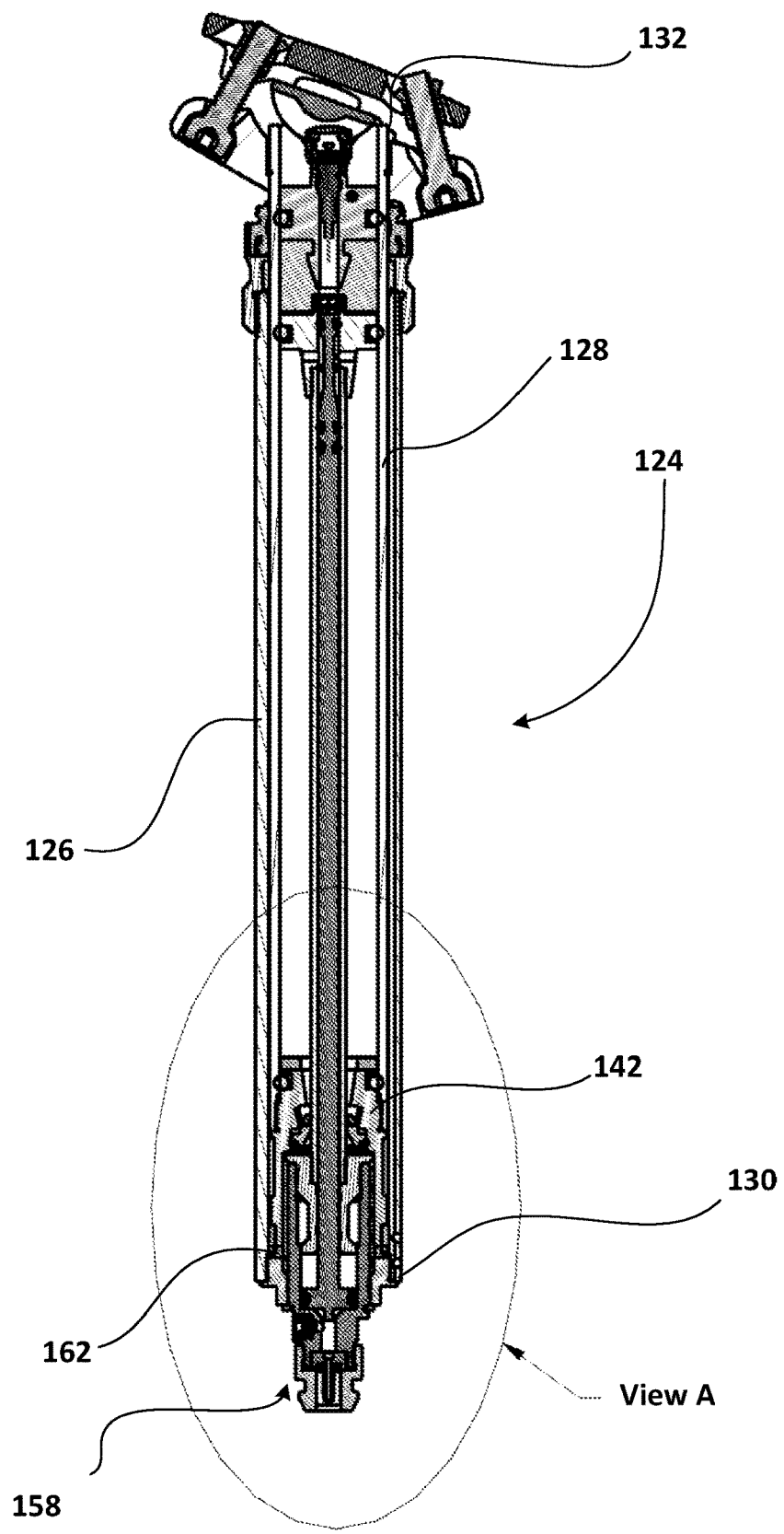
FIG. 10 is a side cross-section of the first seat post assembly, in a first fully retracted position.
Figure 11:
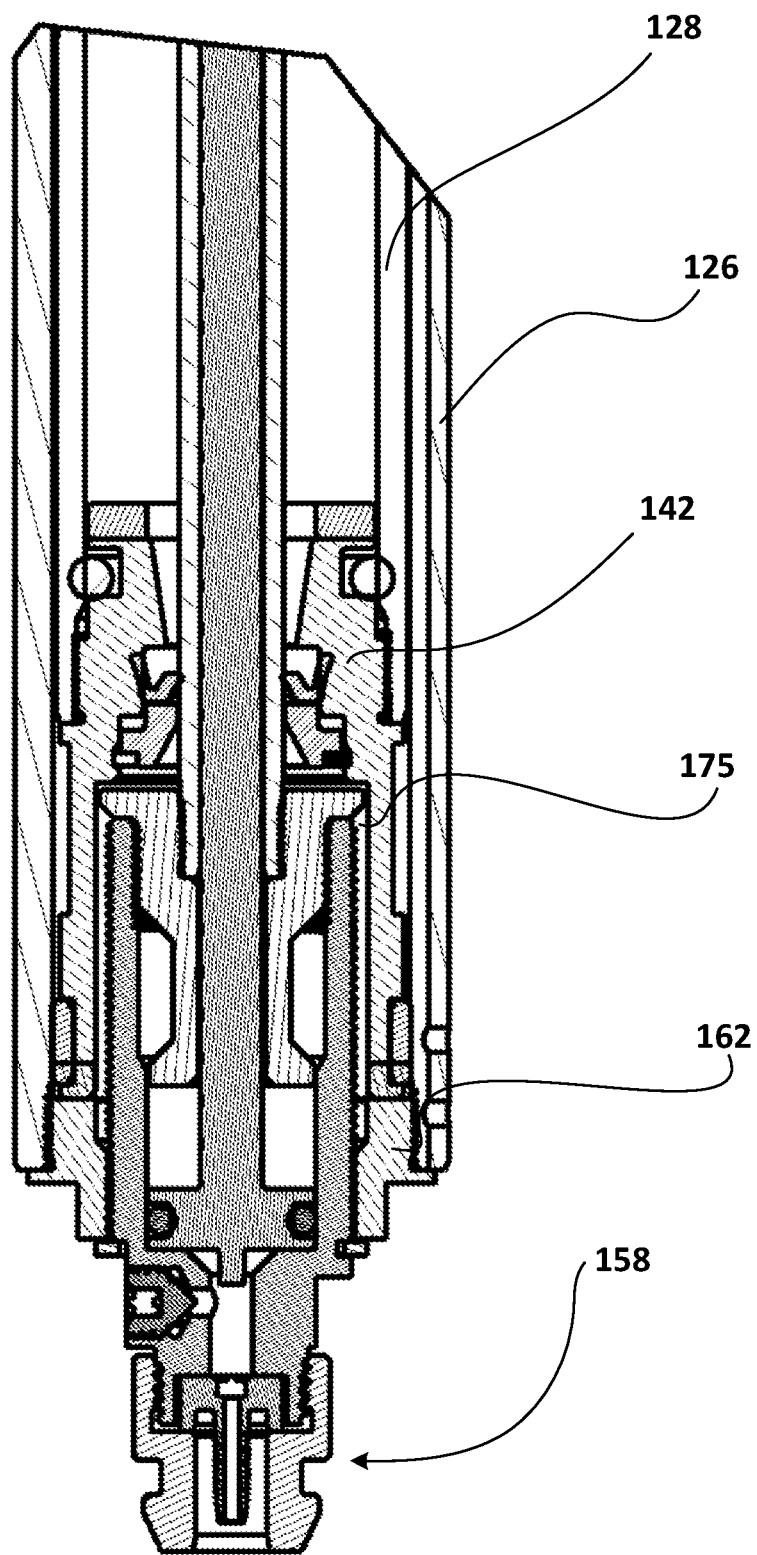
FIG. 11 is close-up view A of the side cross-section of the first seat post assembly of FIG. 10.

Alternatively, referring to FIGS. 10 and 11, the seat post assembly 124 may be positioned in a fully retracted or contracted position with the upper tube 128 retracted into the lower tube 126 to a fullest extent. The distance between the first distal end 132 and the second distal end 130 may be at a minimum (e.g., the fully retracted position) when the upper tube 128 is in a second position relative to the lower tube 126.

Referring to FIG. 11, the fully retracted position of the seat post assembly 124 may also correspond to the bottom out position where the seal head 142 is in contact with (e.g., abuts), for example, the lock ring 162. The seal head 142 may include a recess or cavity 175 (e.g., a cavity) on a side of the seal head 142 facing the end cap 158. A portion of the end cap 158 may be positioned within the cavity 175 when the seat post assembly 124 is in the fully retracted position. A bumper made of a flexible material (e.g., rubber) may be disposed within the third pneumatic chamber 150, between the lock ring 162 and the seal head 142. For example, the bumper may be disposed on the lock ring 162 and abut the seal head 142 when the seat post assembly 124 is in the bottom out position.

Raising or lowering the upper tube 128 relative to the lower tube 126 raises or lowers the seat or saddle 106 relative to the frame 102. The seat post assembly 124 may also be positioned in any number of intermediate positions (see FIG. 9) between the fully extended position and the fully contracted position, according to the desire of the rider.

Referring to FIG. 5, the second side 168 of the piston head 154 includes a portion that is angled relative to the first side 166 of the piston head 154, such that the piston head 154 is a conical frustum. The volume of the second pneumatic chamber 148 when the seat post assembly 124 is in the fully extended position may be minimized using different sizes and shapes of the second side 168 of the piston head 154. The volume of the second pneumatic chamber 148 when the seat post assembly 124 is in the fully extended position may be minimized by the size and shape of the second side 168 of the piston head 154 partially or fully corresponding to (e.g., matching) the size and shape of a portion of the seal head 142 facing the piston head 154.

Figure 9:
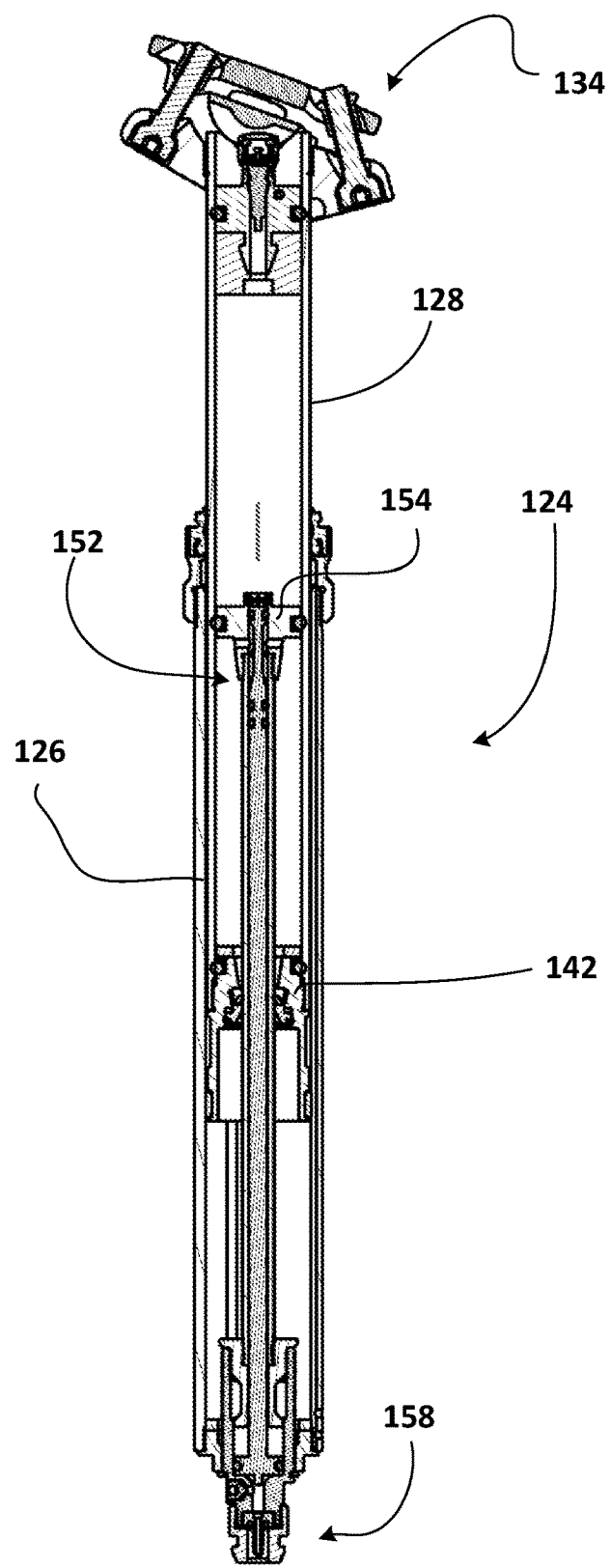
FIG. 9 is a side cross-section of the first seat post assembly, in a first intermediate position.

The seat post assembly 124 may include one or more anti-rotation features (e.g., slots or grooves, and corresponding keys) that prevent rotation of the upper tube 128 relative to the lower tube 126 about an axis of rotation that extends axially relative to the upper tube 128 and the lower tube 126. FIGS. 7, 9, and 10 illustrate translation of the upper tube 128 relative to the lower tube 126 without rotation of the upper tube 128 relative to the lower tube 126. The keys, for example, remain in a same position relative to the upper tube 128 as the upper tube 128 translates from the fully extended position (see FIG. 7) to an intermediate position (see FIG. 9), and finally to the fully retracted position (see FIG. 10). The keys translate with the upper tube 128 relative to the lower tube 126.

In the example shown in FIGS. 2-23, the end cap 158 may act as an actuator (e.g., an actuator assembly). A user (e.g., a rider) may interact with (e.g., turn) the actuator 158 to adjust a height of the top out position of the seat post assembly 124 (e.g., a distance between the first distal end 132 of the upper tube 128 and the second distal end 130 of the lower tube 126). The user may turn the actuator 158 by hand or using any number of common tools (e.g., a hex wrench or a screwdriver).

For example, the actuator 158 is rotatably attached to the lock ring 162 via threads, and as the user rotates the actuator 158 relative to the lock ring 162 and the lower tube 126, the actuator 158 also translates relative to the lower tube 126. The actuator 158 and the piston 152 are essentially positionally fixed (e.g., the piston 152 may not rotate entirely with the actuator 158 due to friction between the piston head 154 and an inner annular wall of the upper tube 128) relative to one another and thus are constrained to not move relative to each other. Thus, as the actuator 158 rotates and translates relative to the lower tube 126, the piston 152 also rotates (e.g., at least partially) and translates relative to the lower tube 126. Depending on a direction of rotation, a distance between the first side 166 of the piston head 154 and the first end of the lower tube 126 (e.g., opposite the second distal end 130 of the lower tube 126) at, for example, the top out position of the seat post assembly 124 increases or decreases.

In one embodiment, the actuator 158 may not be threadably attached to the lock ring 162. The actuator 158 may instead be attached to the lower tube 126 in any number of different ways. For example, the actuator 158 may be clamped (e.g., via one or more screws and one or more grooves) to the inner annular surface of the lower tube 126 or the lock ring 162. The actuator 158 may be unclamped, translated to a position relative to the lower tube 126, and re-clamped, such that the piston 152 also translates relative to the lower tube 126.

As an example, the user may rotate the actuator 158 in a first direction (e.g., counterclockwise) to "unscrew" the actuator 158 from the lock ring 162, and thus the lower tube 126, such that the piston 152 (e.g., the piston head 154) moves axially towards the second distal end 130 of the lower tube 126. The user may rotate the actuator 158 in a second direction (e.g., clockwise) that is opposite the first direction to "screw" the actuator 158 into the lock ring 162, and thus the lower tube 126, such that the piston 152 (e.g., the piston head 154) is allowed to move axially away from the second distal end 130 of the lower tube 126. In one embodiment, rotation of the actuator 158 in the first direction (e.g., counterclockwise) allows the piston 152 to move axially away from the second distal end 130 of the lower tube 126, and rotation of the actuator 158 in the second direction (e.g., clockwise) causes the piston 152 to move axially towards the second distal end 130 of the lower tube 126.

This axial movement of the piston head 154 relative to the lower tube 126 caused by the rotation and resultant axial movement of the actuator 158 relative to the lower tube 126, may move the upper tube 128 relative to the lower tube 126 and adjust a top out height of the seat post assembly 124. For example, as shown in FIG. 7, at the top out position (e.g., top of stroke) of the seat post assembly 124, the piston head 154 of the piston 152 abuts the bumper 165 of the seal head 142. As, for example, the actuator 158 is unscrewed (e.g., rotated in the first direction) from the lock ring 162, and thus the lower tube 126, and the piston head 154 moves towards the second distal end 130 of the lower tube 126, the movement of the piston head 154 and the contact between the piston head 154 and the seal head 142 (e.g., via the bumper 165) causes the seal head 142, and thus the upper tube 128, to move relative to the lower tube 126 (e.g., towards the second distal end 130 of the lower tube 126).

Figure 8:
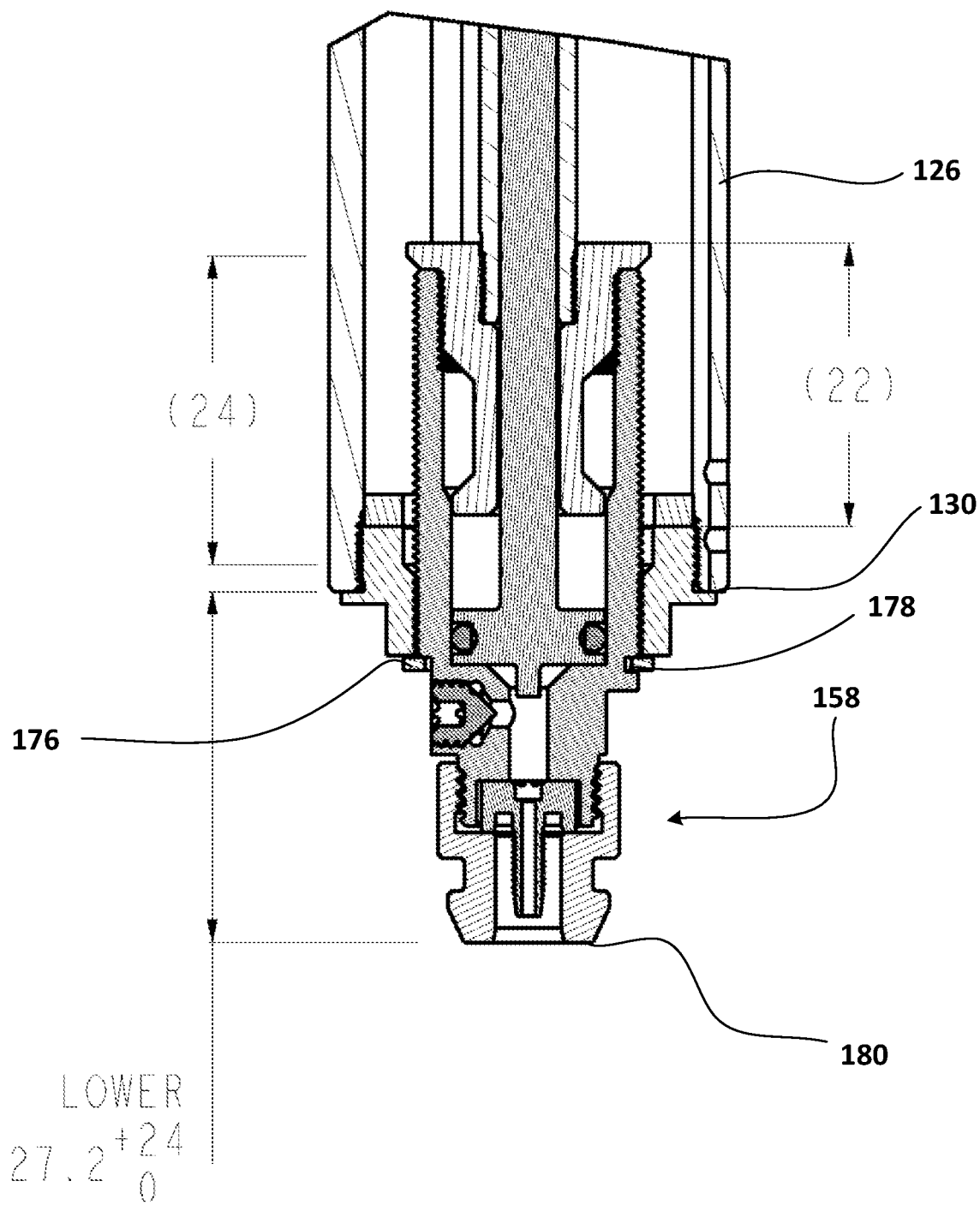
FIG. 8 is close-up view A of the side cross-section of the first seat post assembly of FIG. 7.

Referring to FIG. 8, the actuator 158 may include a retaining ring 176. The retaining ring 176 may be positioned within a groove 178 extending around some or all of the actuator 158. The retaining ring 176 prevents over-rotation of the actuator 158 into the lower tube 126 and may set the maximum seat post height of the seat post assembly 124.

Figure 12:
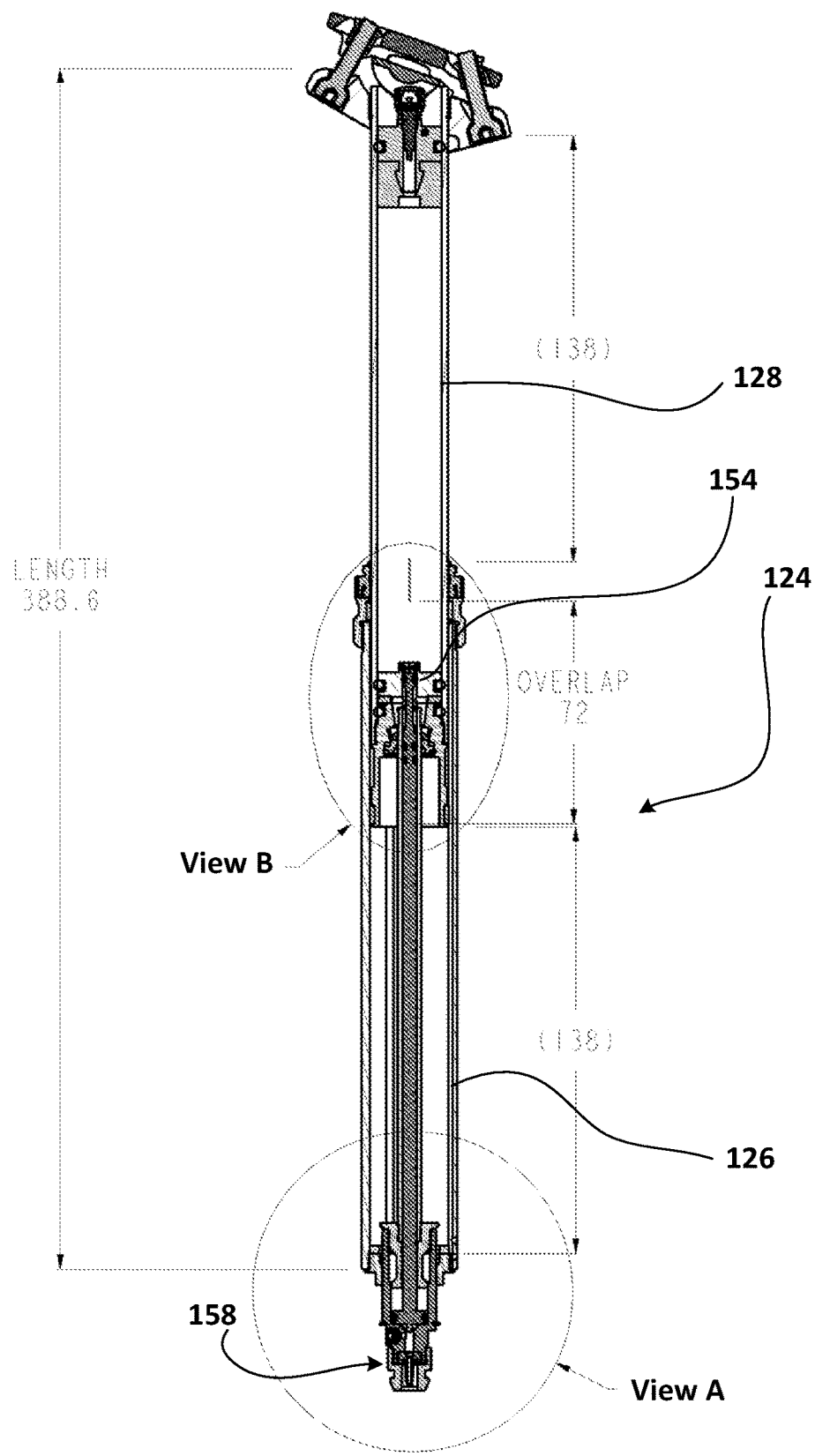
FIG. 12 is a side cross-section of the first seat post assembly, in a second fully extended position.

FIG. 12 illustrates the top out position of the seat post assembly 124 after a first adjustment of the actuator 158. The adjustment of the actuator 158 shown in FIG. 12 may correspond to a medium top out height of the seat post assembly 124. The top out height of the adjusted seat post assembly 124 shown in FIG. 12 is 388.6 mm, and a length of the stroke of the piston head 154 is less than 150.5 mm. In other embodiments, the maximum seat post height and/or the stroke of the piston head 154 may be greater or lesser. For example, the maximum seat post height may be 375 mm or 395 mm.

Figure 13:
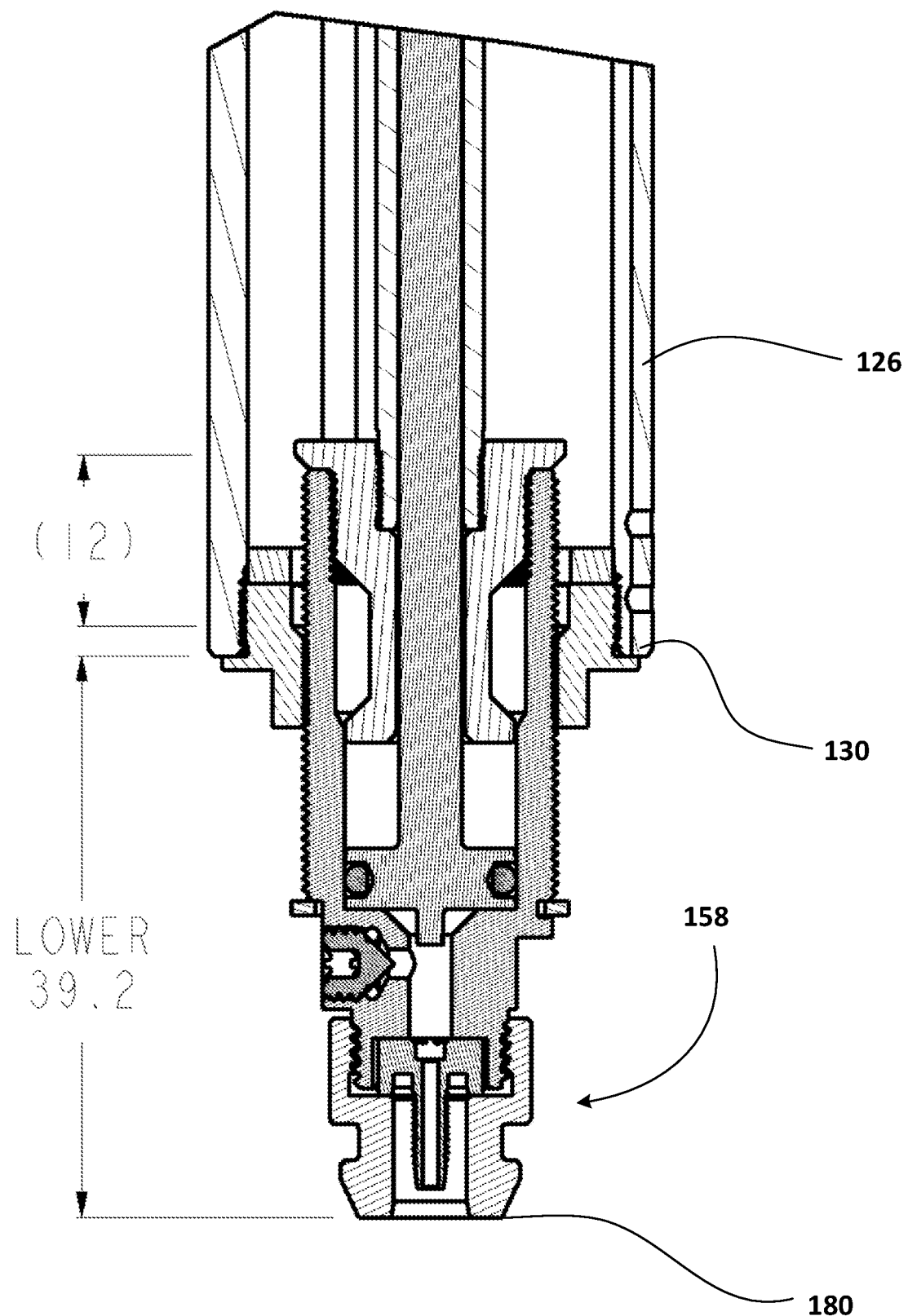
FIG. 13 is close-up view A of the side cross-section of the first seat post assembly of FIG. 12.
Figure 17:
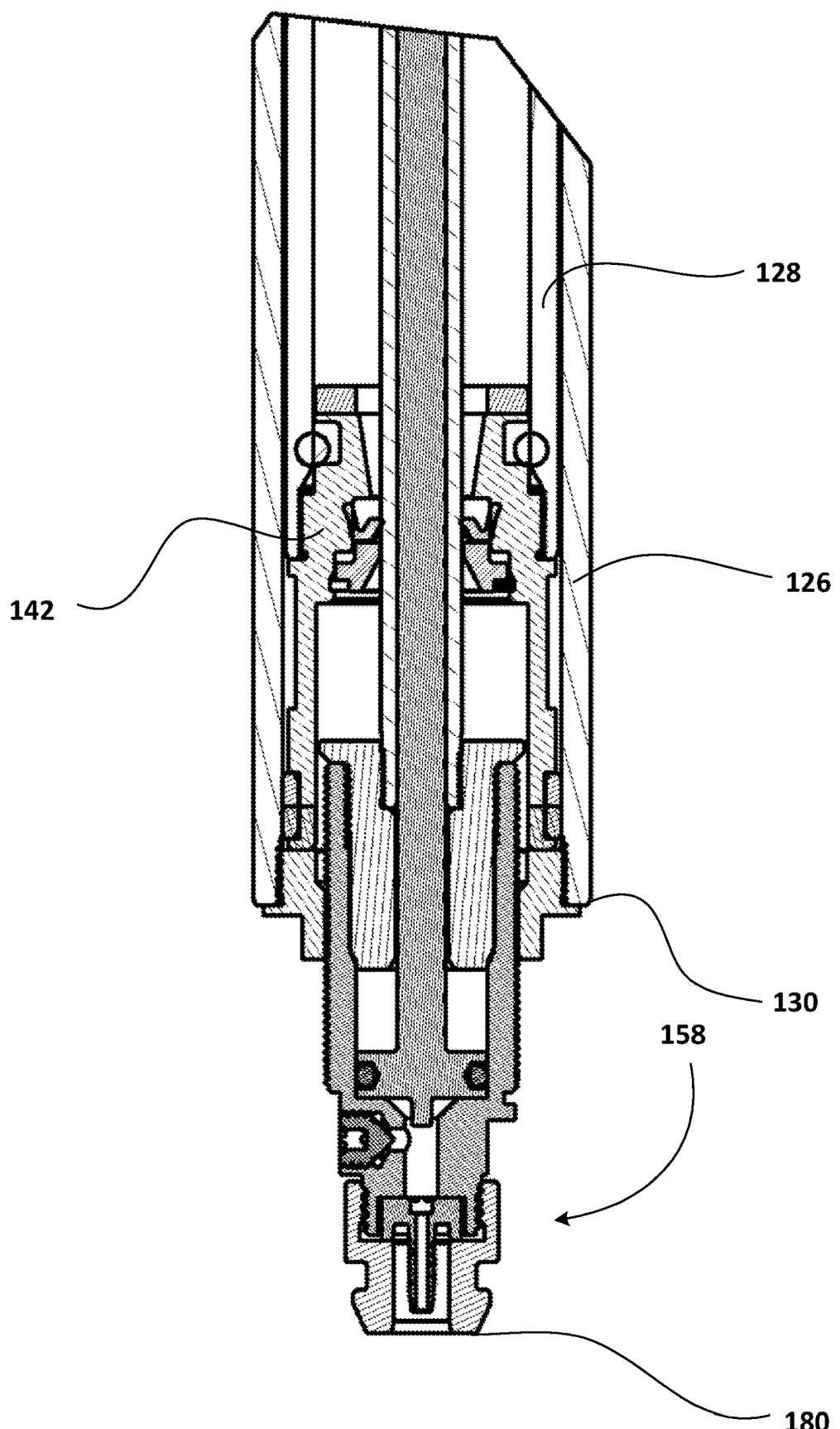
FIG. 17 is close-up view A of the side cross-section of the first seat post assembly of FIG. 16.

Referring to FIGS. 13 and 17, a distance between the second distal end 130 of the lower tube 126 and an end 180 of the actuator 158 that is outside of the lower tube 126 is greater compared to in the example shown in FIG. 8 at the maximum seat post height of the seat post assembly 124. In other words, in FIG. 13, the actuator 158 has been unscrewed out of the lower tube 126. In the example shown in FIG. 13, the end 180 of the actuator 158 has moved 12.0 mm axially relative to the second distal end 130 of the lower tube 126. For example, in FIG. 13, an axial distance between the end 180 of the actuator 158 and the second distal end 130 of the lower tube 126 is 39.2 mm, while the axial distance between the end 180 of the actuator and the second distal end 130 of the lower tube 126 is 27.2 mm in the example shown in FIG. 8.

Figure 14:
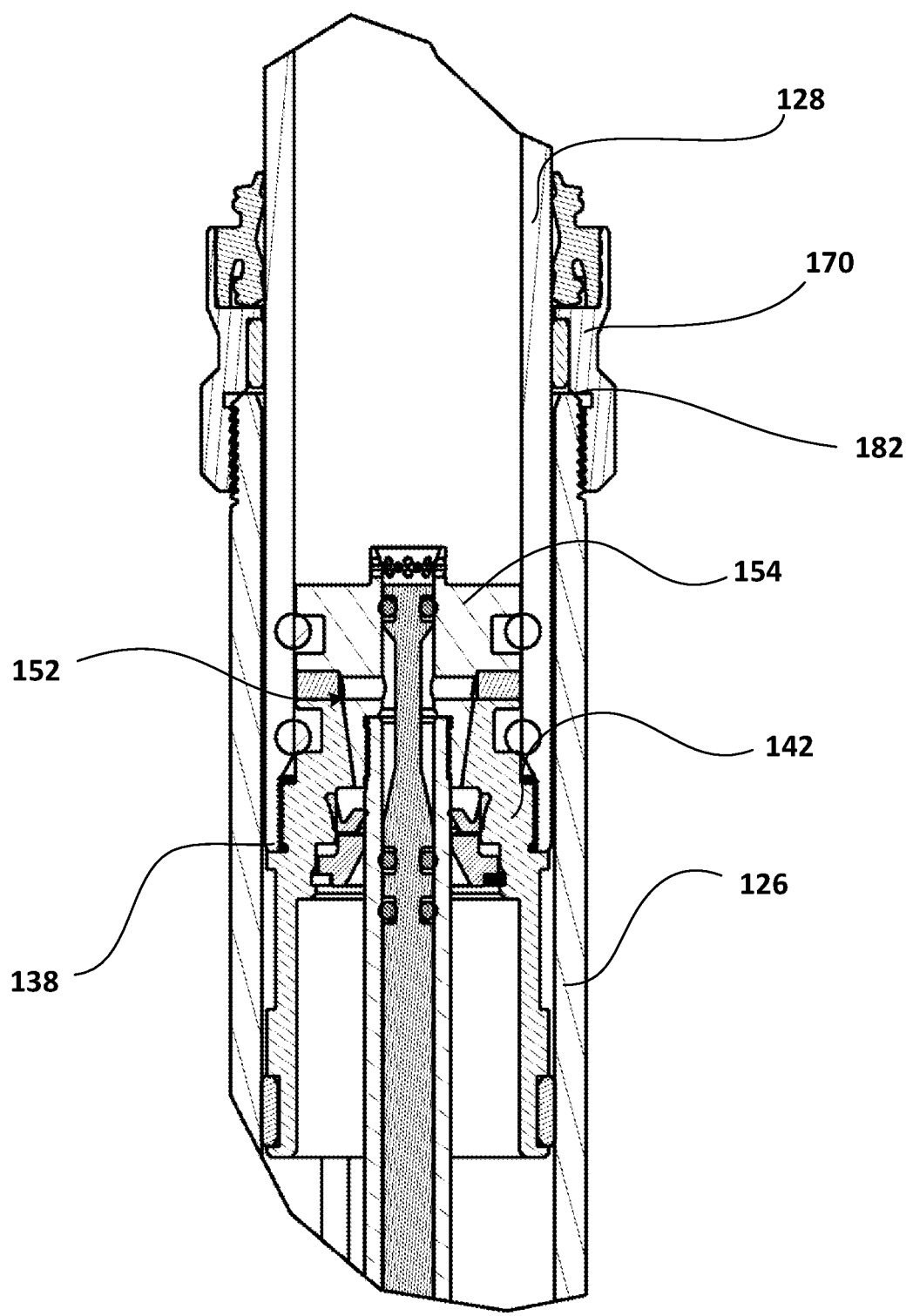
FIG. 14 is close-up view B of the side cross-section of the first seat post assembly of FIG. 12.

FIG. 14, compared to FIG. 7, illustrates how the piston head 154 of the piston 152 is moved further into the lower tube 126 and away from a first end 182 of the lower tube 126 and the collar 170 with the unscrewing of the actuator 158 out of the lower tube 126. This motion of the piston head 154 further into the lower tube 126, away from the first end 182 of the lower tube 126, causes the seal head 142, and thus the second end 138 of the upper tube 128 to also move further into the lower tube 126. This motion of the upper tube 128 further into the lower tube 126 decreases the top out height of the seat post assembly 124.

Figure 15:
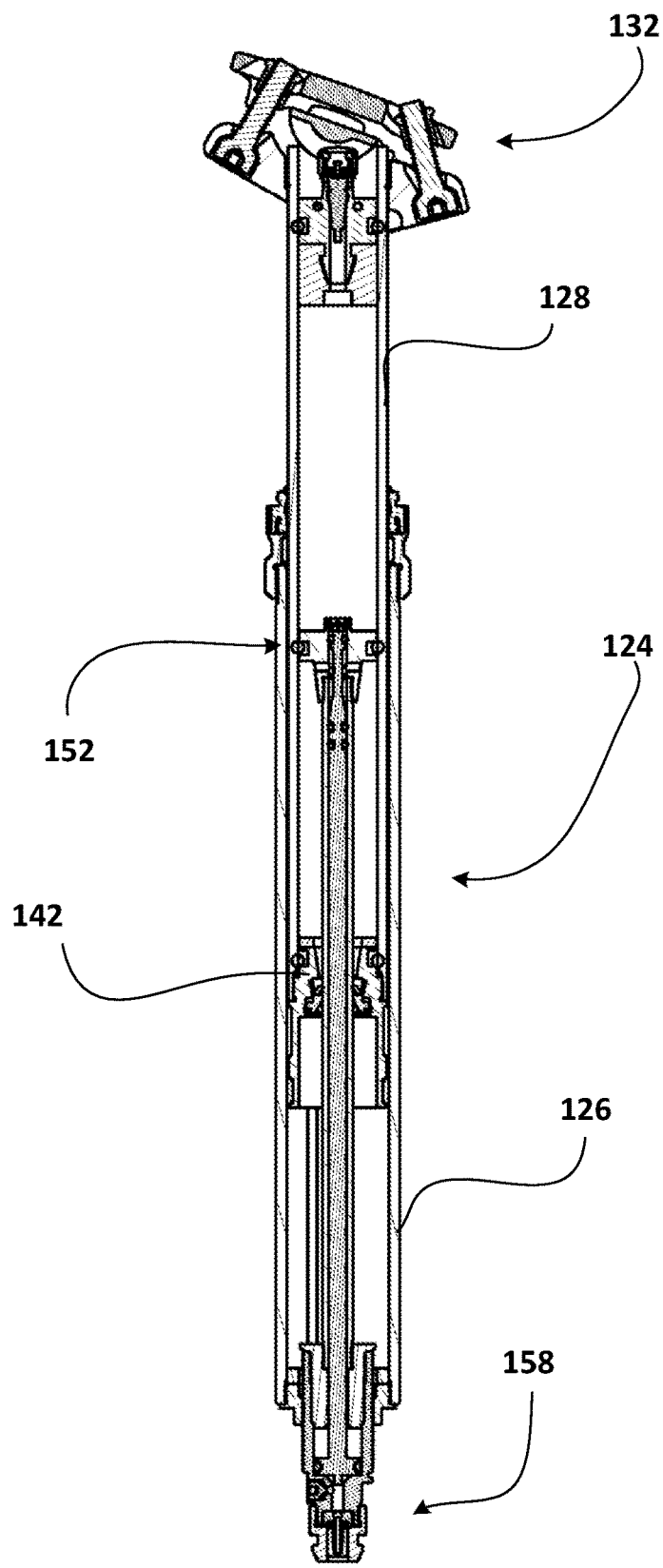
FIG. 15 is a side cross-section of the first seat post assembly, in a second intermediate position.
Figure 16:
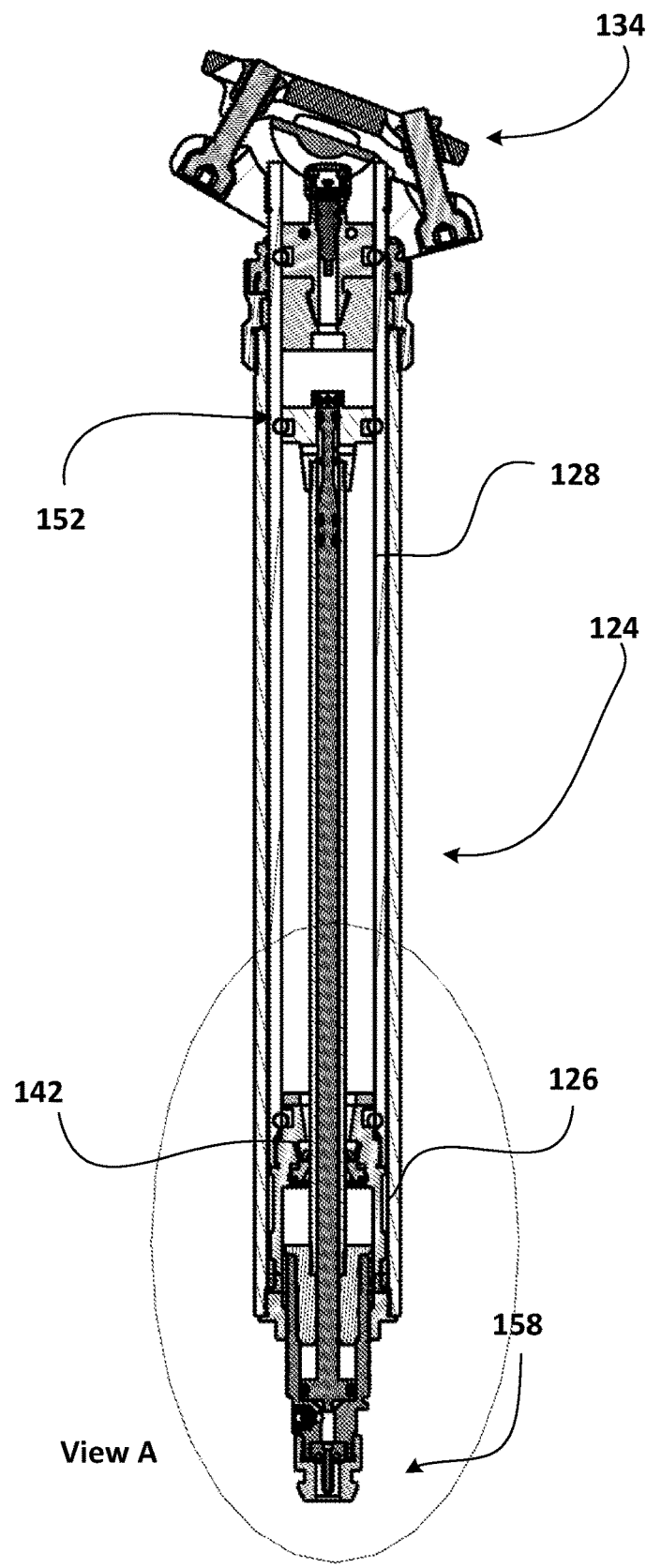
FIG. 16 is a side cross-section of the first seat post assembly, in a second fully retracted position.

FIGS. 12, 15, and 16 illustrate translation of the upper tube 128 relative to the lower tube 126 without rotation of the upper tube 128 relative to the lower tube 126. The upper tube 128 translates from the fully extended position (see FIG. 12) to an intermediate position (see FIG. 15), and finally to the fully retracted position (see FIG. 16). FIGS. 12, 15, and 16 represent the fully extended position, the intermediate position, and the fully retracted position, respectively, after the first adjustment of the actuator 158.

Figure 18:
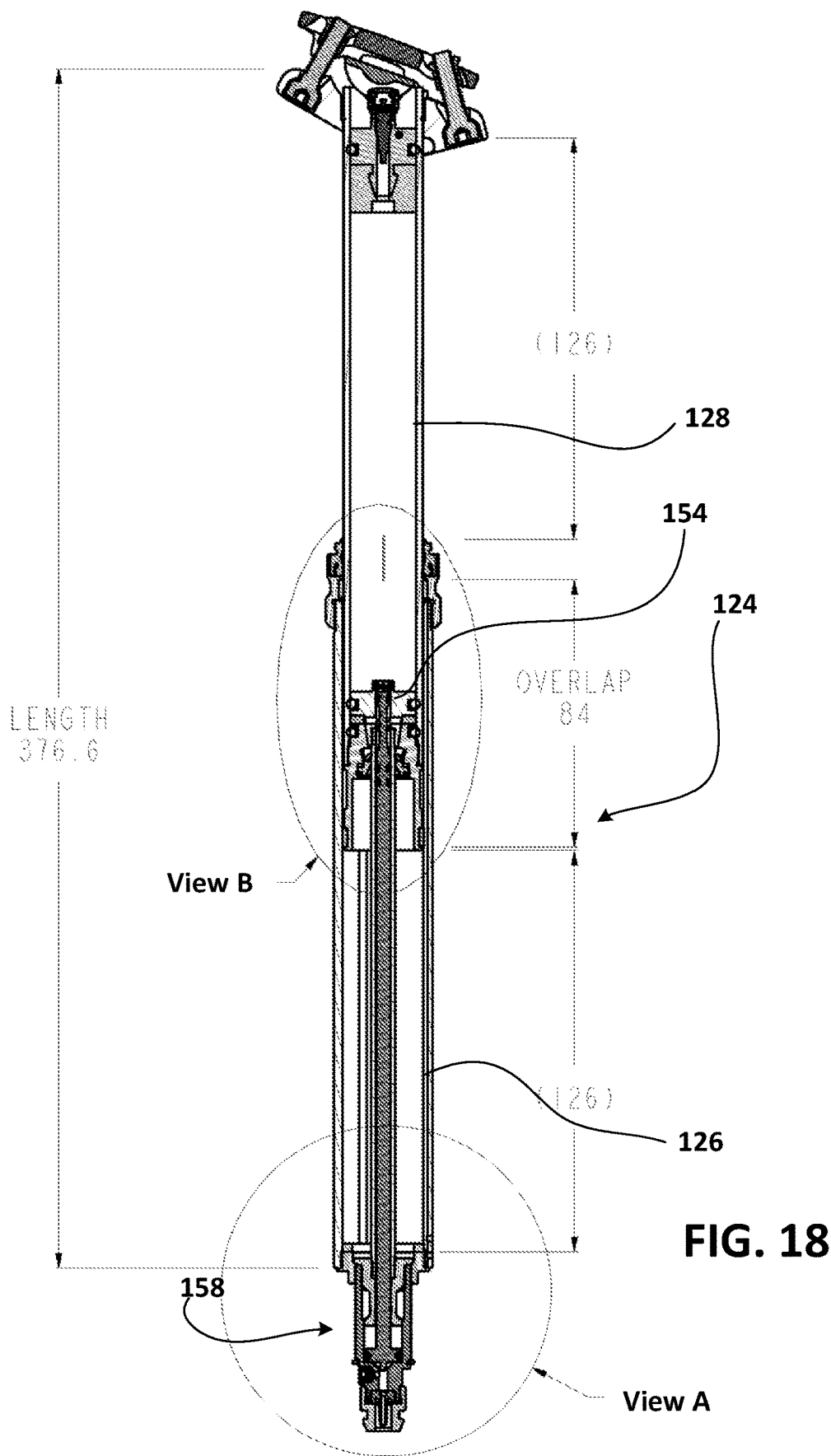
FIG. 18 is a side cross-section of the first seat post assembly, in a third fully extended position.

FIG. 18 illustrates the top out position of the seat post assembly 124 after a second adjustment of the actuator 158. The adjustment of the actuator 158 shown in FIG. 18 may correspond to a minimum top out height of the seat post assembly 124. The top out height of the adjusted seat post assembly 124 shown in FIG. 18 is 376.6 mm, and a length of the stroke of the piston head 154 is less than the stroke of the piston head 154 shown in FIG. 12. In other embodiments, the minimum top out height and/or the stroke of the piston head 154 may be greater or lesser. For example, the minimum top out height may be 365 mm or 385 mm.

Figure 19:
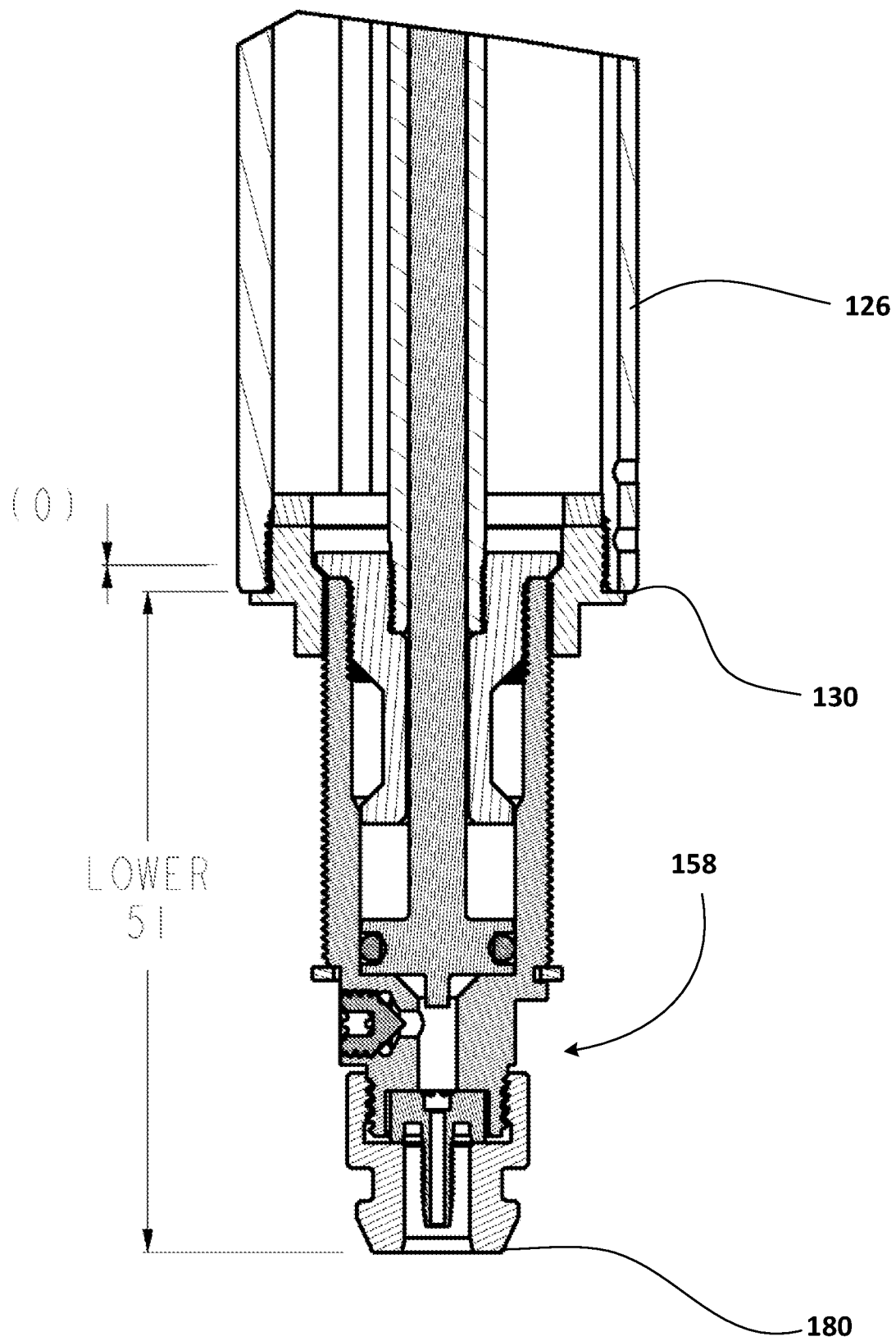
FIG. 19 is close-up view A of the side cross-section of the first seat post assembly of FIG. 18.

Referring to FIG. 19, a distance between the second distal end 130 of the lower tube 126 and the end 180 of the actuator 158 is greater compared to in the example shown in FIG. 13, with the first adjustment of the actuator. In other words, in FIG. 19, the actuator 158 has been unscrewed further out of the lower tube 126 compared to the example shown in FIG. 13. In the example shown in FIG. 19, the end 180 of the actuator 158 has moved 23.8 mm axially relative to the second distal end 130 of the lower tube 126 compared to the example shown in FIG. 8. For example, in FIG. 19, an axial distance between the end 180 of the actuator 158 and the second distal end 130 of the lower tube 126 is 51.0 mm, while the axial distance between the end 180 of the actuator and the second distal end 130 of the lower tube 126 is 27.2 mm in the example shown in FIG. 8.

Figure 20:
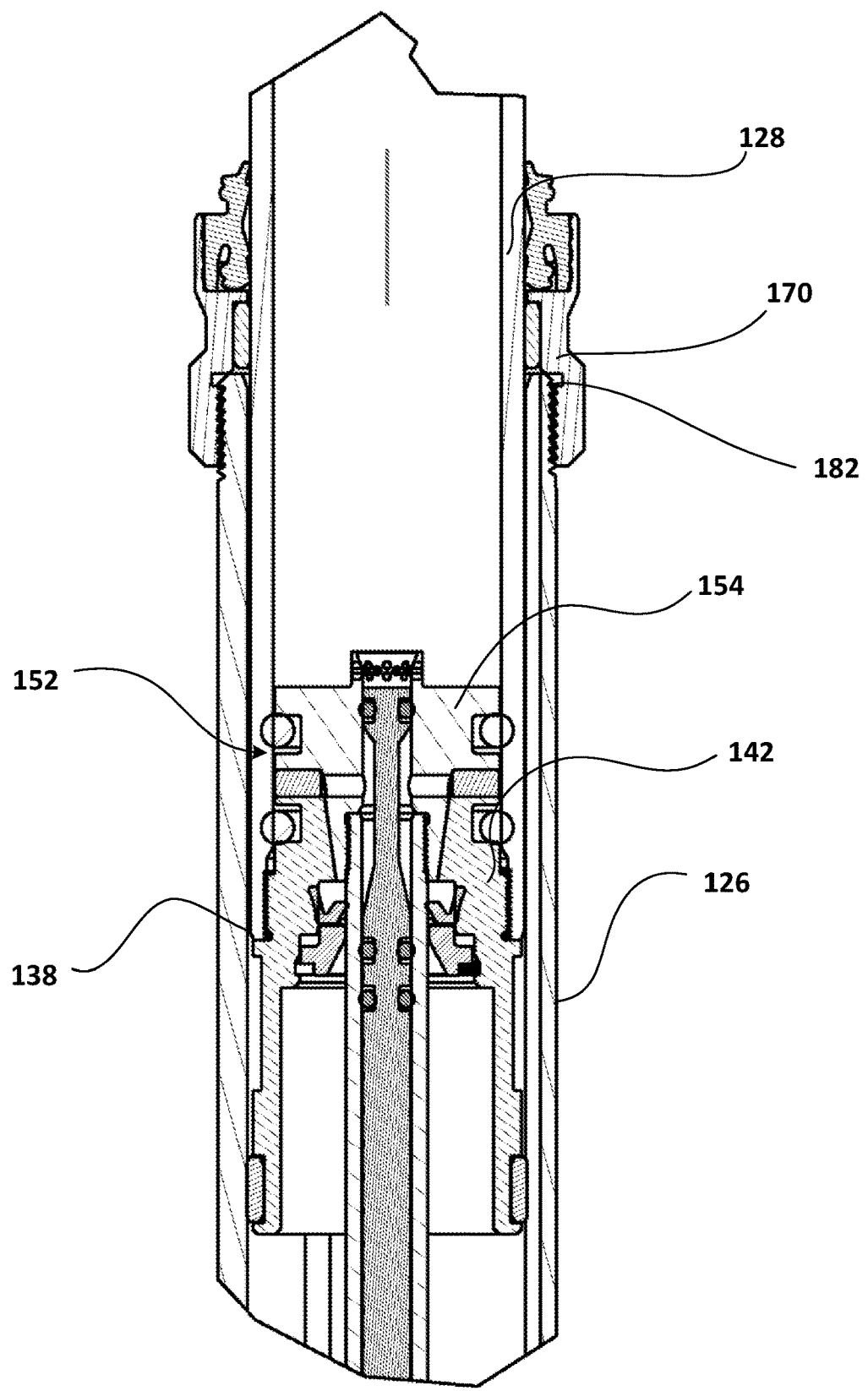
FIG. 20 is close-up view B of the side cross-section of the first seat post assembly of FIG. 18.

FIG. 20, compared to FIG. 14, illustrates how the piston head 154 of the piston 152 is moved further into the lower tube 126 and away from the first end 182 of the lower tube 126 and the collar 170 with the further unscrewing of the actuator 158 out of the lower tube 126. This motion of the piston head 154 further into the lower tube 126, away from the first end 182 of the lower tube 126, causes the seal head 142, and thus the second end 138 of the upper tube 128 to also move further into the lower tube 126. This motion of the upper tube 128 further into the lower tube 126 decreases the top out height of the seat post assembly 124.

Figure 21:
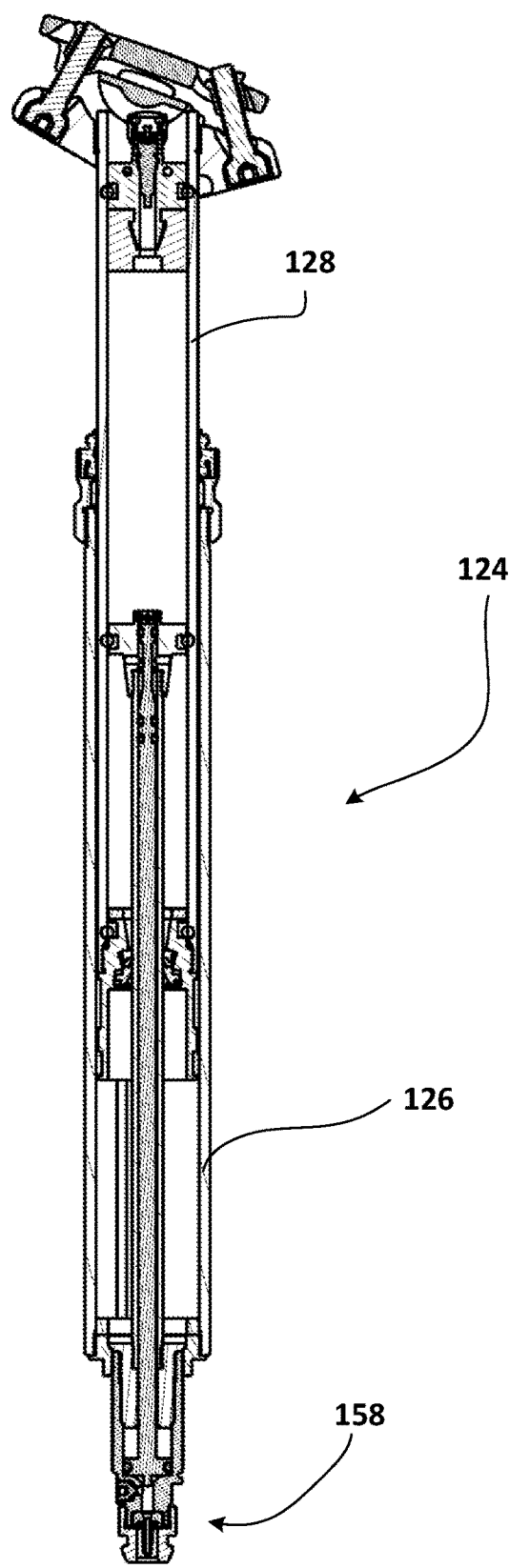
FIG. 21 is a side cross-section of the first seat post assembly, in a third intermediate position.
Figure 22:
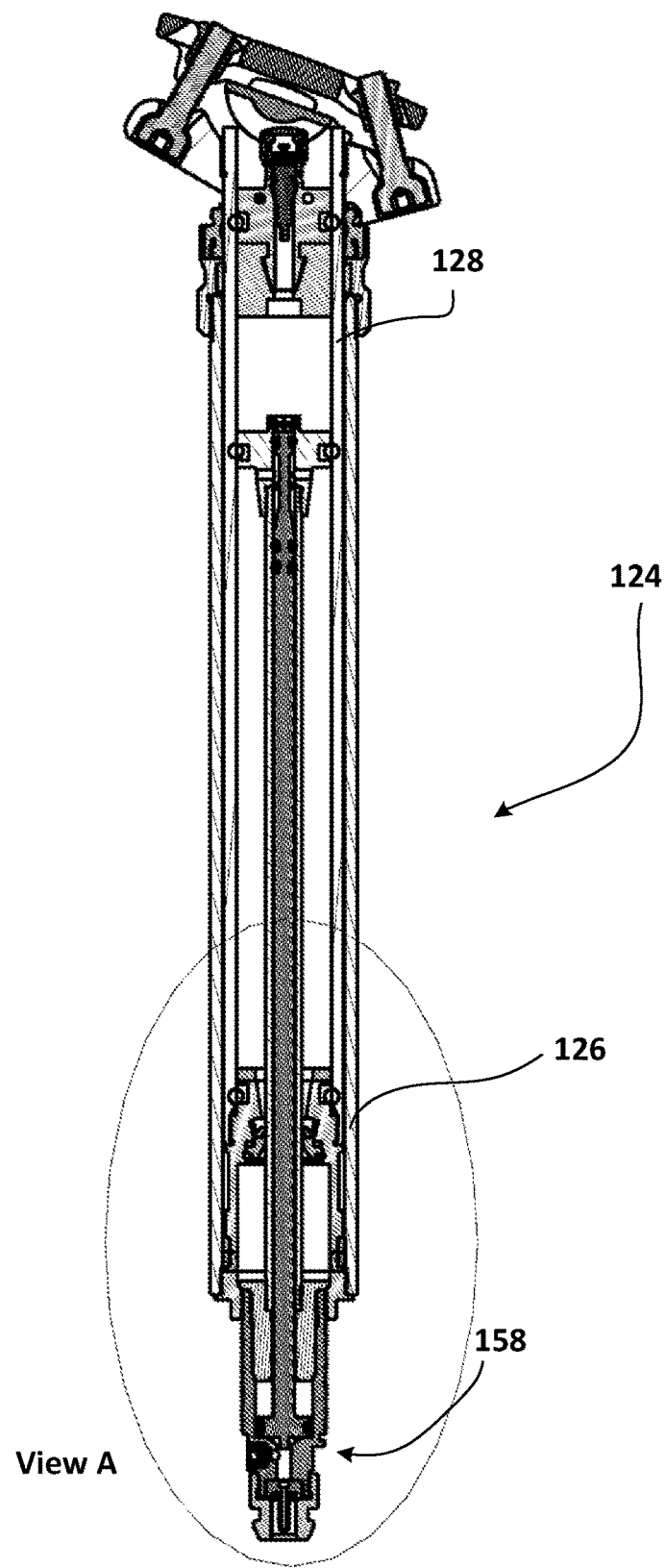
FIG. 22 is a side cross-section of the first seat post assembly, in a third fully retracted position.

FIGS. 18, 21, and 22 illustrate translation of the upper tube 128 relative to the lower tube 126 without rotation of the upper tube 128 relative to the lower tube 126. The upper tube 128 translates from the fully extended position (see FIG. 18) to an intermediate position (see FIG. 21), and finally to the fully retracted position (see FIG. 22). FIGS. 18, 21, and 22 represent the fully extended position, the intermediate position, and the fully retracted position, respectively, after the second adjustment of the actuator 158. Other seat post height adjustments between the maximum seat post height shown in FIG. 7 and the top out height shown in FIG. 12 and/or between the top out height shown in FIG. 12 and the minimum top out height shown in FIG. 18 may be provided.

Figure 23:
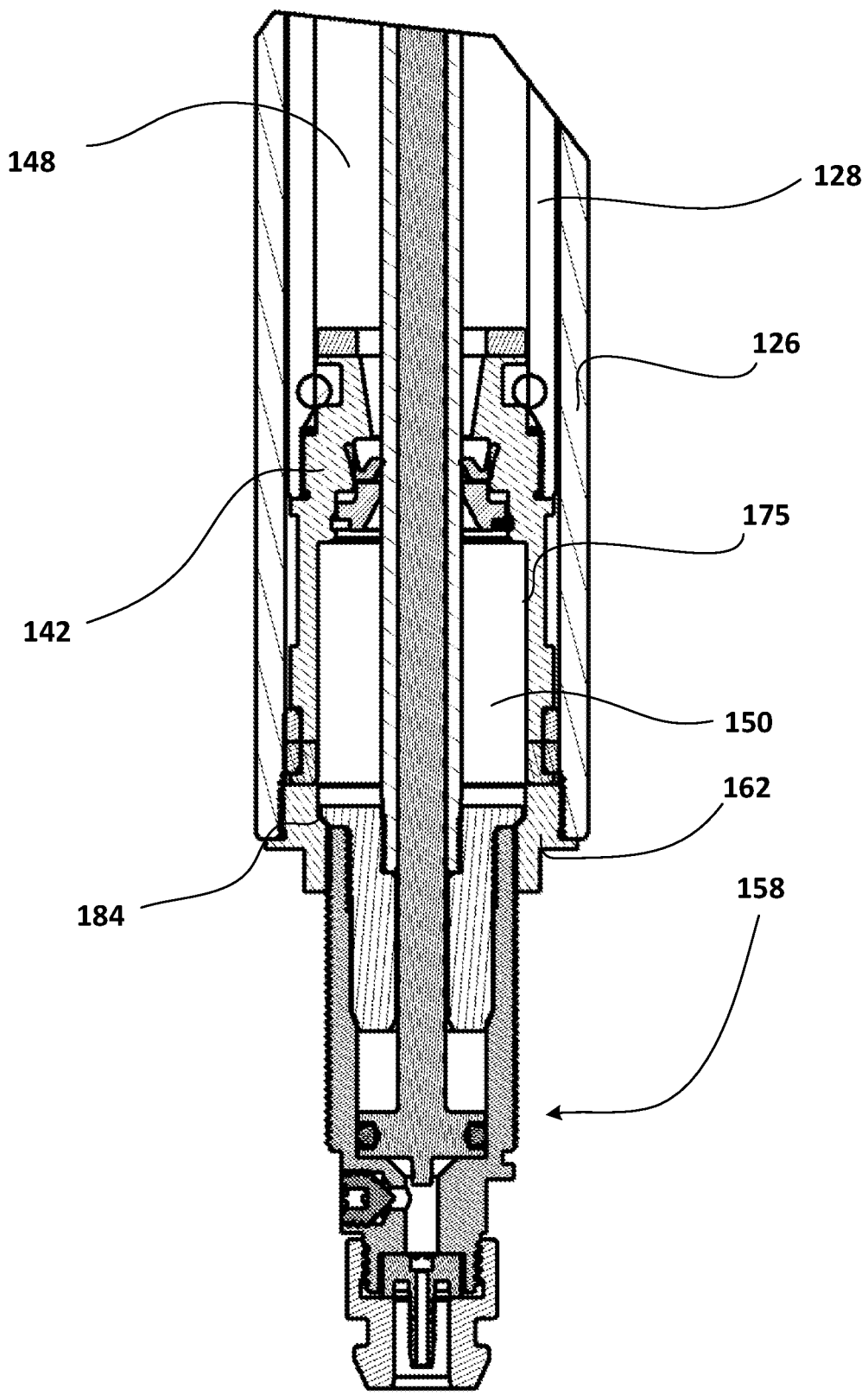
FIG. 23 is close-up view A of the side cross-section of the first seat post assembly of FIG. 22.

Referring to FIG. 23, after the second adjustment of the actuator 158, the third pneumatic chamber 150 in the fully retracted position of the seat post assembly 124 is larger (e.g., has a greater volume) compared to in the example shown in FIG. 17 due to the actuator 158 being further moved out of the cavity 175 of the seal head 142 when the seat post assembly 124 is in the bottom out position. The actuator 158 includes a lip, a flange, or another extension (e.g., extension 184) that abuts the lock ring 162 when the seat post assembly 124 is in the bottom out position after the second adjustment of the actuator 158. The lock ring 162 may act as a stop in such a position of the seat post assembly 124 in that the lock ring 162 prevents the actuator 158 from being unscrewed completely out of the lower tube 126.

Figure 24:
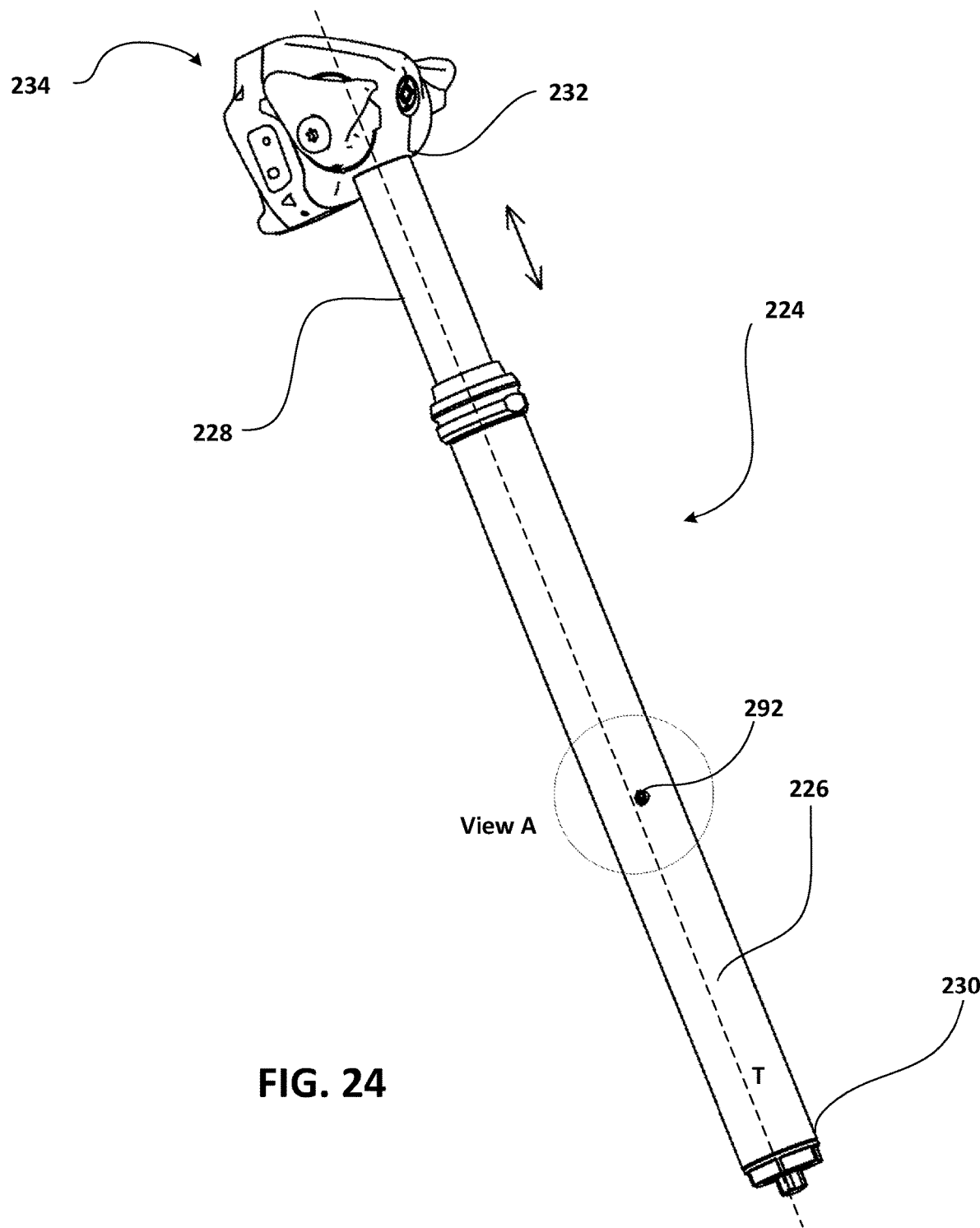
FIG. 24 is a perspective view of a second seat post assembly constructed in accordance with the teachings of this disclosure.

Other configurations may be provided. For example, FIGS. 24-30 show a second embodiment of a seat post assembly 224. Referring to FIG. 24, similar to as described above with reference to the first embodiment, a saddle 106 is attachable to and carried on the top of the seat post assembly 224. The seat post assembly 224 has a lower post segment (e.g., a lower tube 226) and an upper post segment (e.g., an upper tube 228). The upper tube 228 (e.g., a first tube) and the lower tube 226 (e.g., a second tube) are movable relative to one another to establish a height of the saddle 106 relative to the frame 102. The lower tube 226 has a lower distal end 230 defining a lower end of the seat post assembly 224. The upper tube 228 has an upper distal end 232 (e.g., a first distal end) defining an upper end of the seat post assembly 224. In one example, the lower distal end 230 (e.g., a second distal end) may be received in and clamped or otherwise secured in a frame tube 133 (see FIG. 1) of the frame 102 in a conventional manner. Thus, the lower tube 226 may be fixed relative to the frame 102 during use, and the upper tube 228 may be slidably and telescopically received in or on the lower tube 226. The upper tube 228 may slide telescopically along a tube axis T relative to the lower tube 226 to establish a distance between the first distal end 232 and the second distal end 230, respectively.

Figure 26:
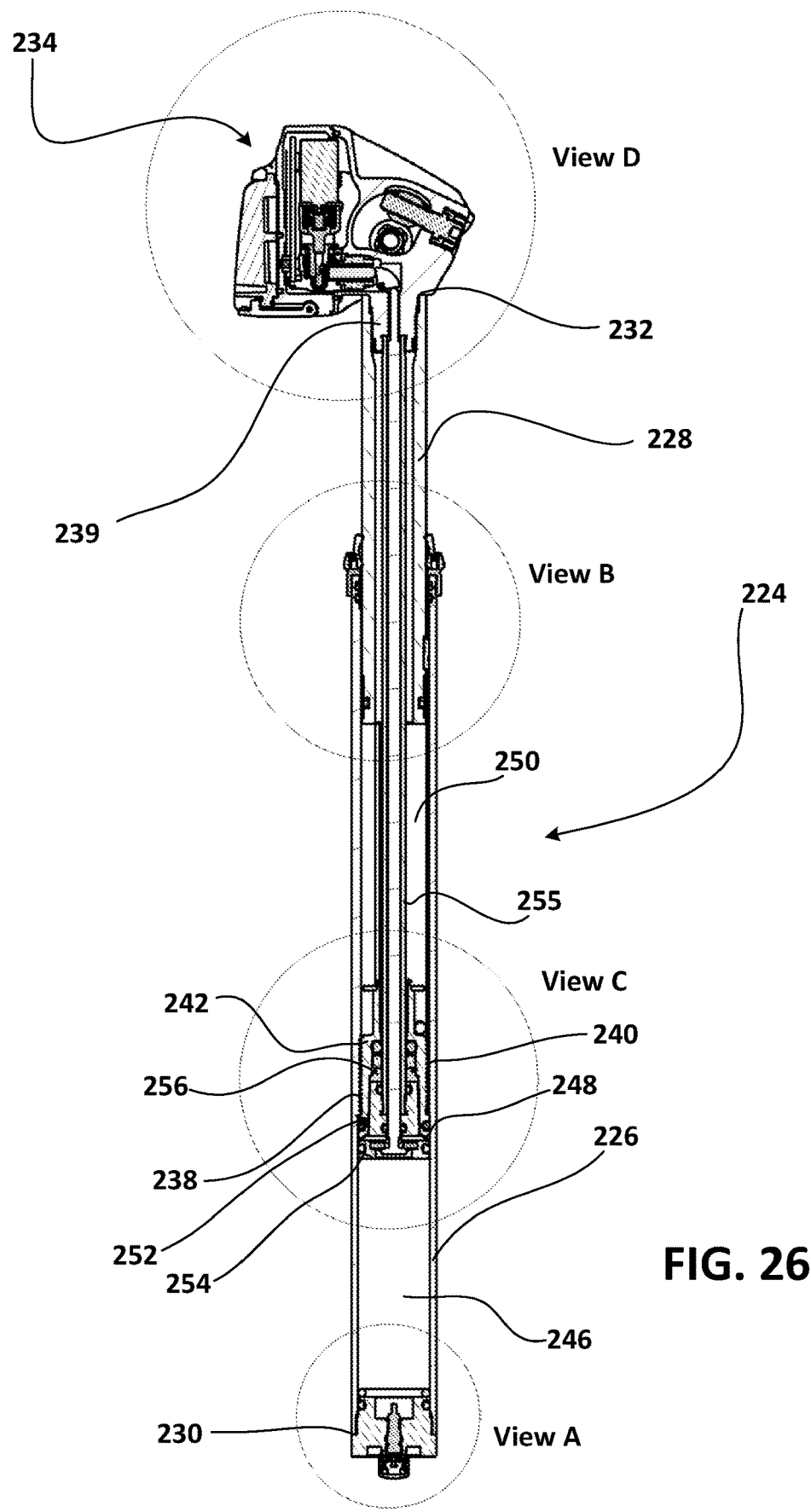
FIG. 26 is a side cross-section of the second seat post assembly of FIG. 24.
Figure 30:
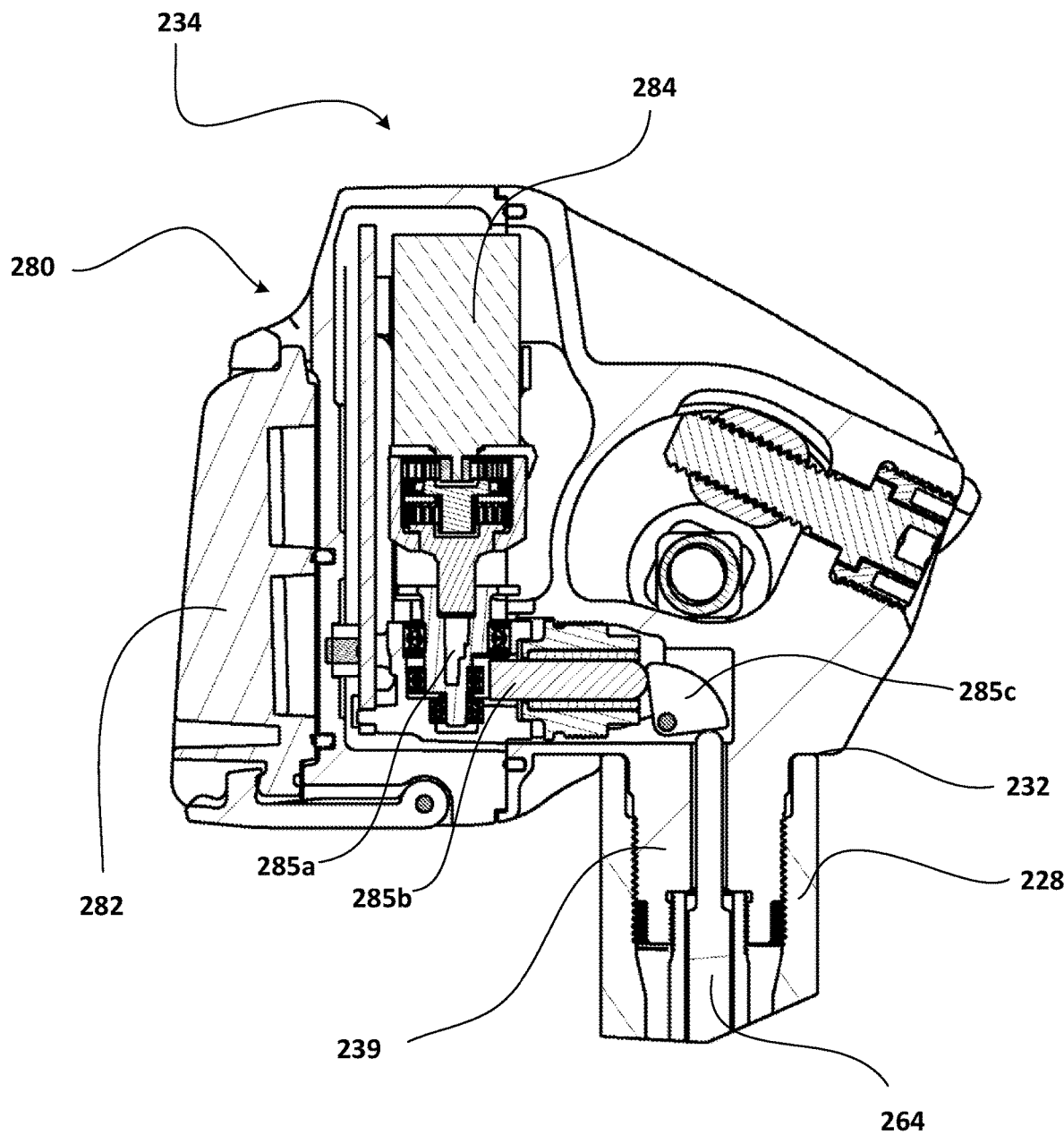
FIG. 30 is close-up view D of the side cross-section of the second seat post assembly of FIG. 26.

Referring to FIGS. 24, 26, and 30, a head 234 is fixed to the top of the seat post assembly 224 (e.g., to the first distal end 232 of the upper tube 228). The saddle 106 is mountable to and carried on the head 234 to attach the saddle 106 to the seat post assembly 224. The first distal end 232 of the upper tube 228 is attached to the head 234 in any number of ways. For example, referring to FIGS. 26 and 30, the first distal end 232 of the upper tube 228 is threaded onto a boss 239 of the head 234 that protrudes from a bottom of the head 234. The boss 239 may be integral with the head 234 or may be a separate part attached (e.g., threadedly attached) to the head 234. Alternatively or additionally, connectors such as, for example, screws, bolts, flanges, tabs, and/or other connectors may be used to attach the first distal end 232 of the upper tube 228 to the head 234.

Figure 27:
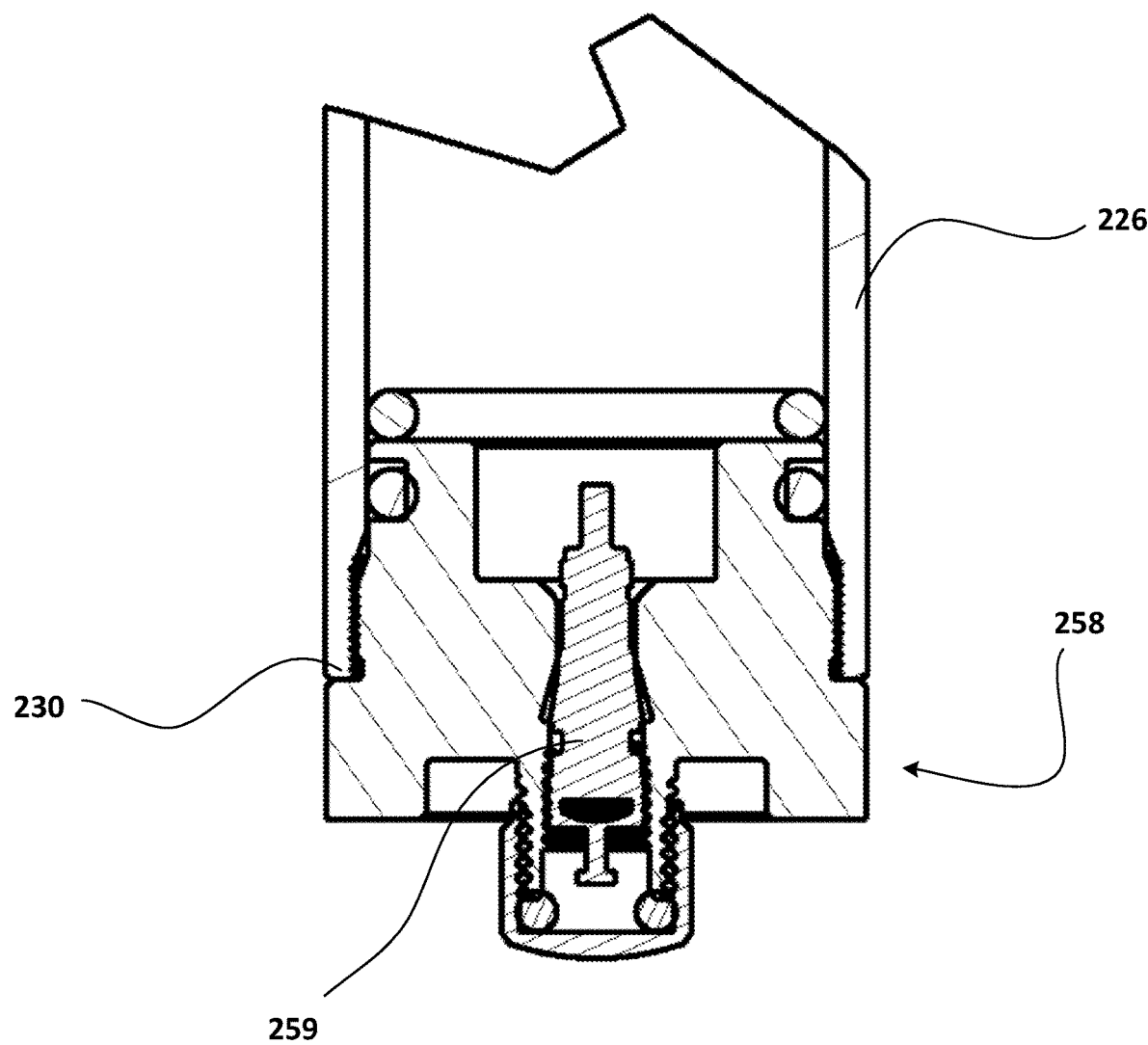
FIG. 27 is close-up view A of the side cross-section of the second seat post assembly of FIG. 26.
Figure 29:
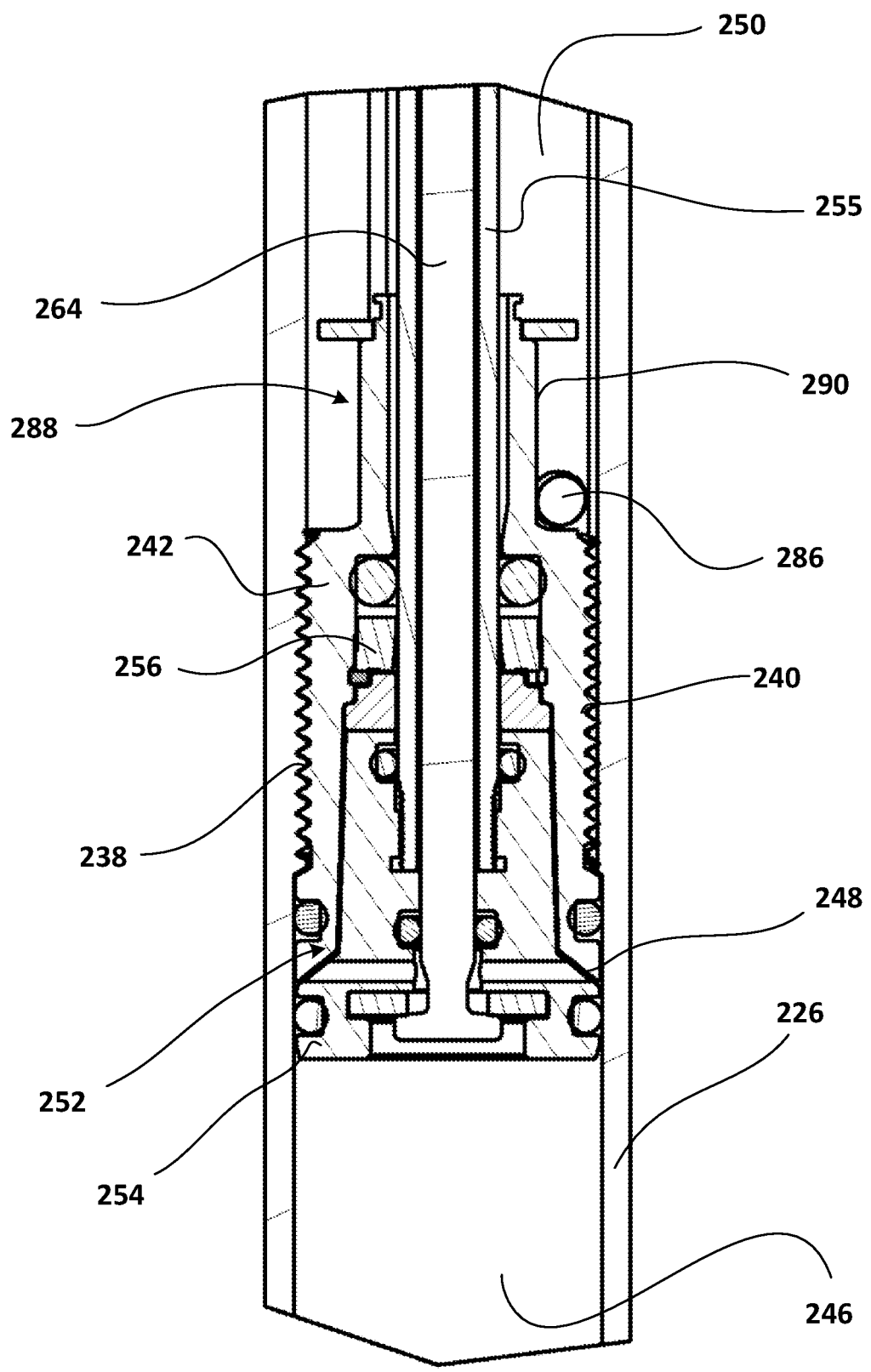
FIG. 29 is close-up view C of the side cross-section of the second seat post assembly of FIG. 26.

Referring to FIGS. 26 and 29, an outer portion 240 (e.g., a threaded outer portion) of a seal head 242 is threaded to an inner surface 238 of the lower tube 226. The upper tube 228 may be sealed from a surrounding environment (e.g., when valves are closed) with the boss 239 of the head 234 and the seal head 242. A portion of a piston 252 (e.g., a piston head 254) is received within an interior of the lower tube 226. The piston head 254 is disposed at a lower end of the piston 252. A piston shaft 255 is threadably connected to a stem 256 that protrudes from the piston head 254 in a direction towards the head 234. The piston shaft 255 extends through the seal head 242, a portion of the lower tube 226, the upper tube 228, and is threadably connected to the boss 239 of the head 234. Referring to FIG. 27, an end cap 258 is threaded into or onto the second distal end 230 of the lower tube 226. The end cap 258 may include, for example, a valve 259 (e.g., a vent and/or fill valve; a Schrader valve). The valve 259 may be used to vent and/or add fluid (e.g., gas; air) to, for example, a chamber (e.g., a positive chamber) of the seat post assembly 224.

The seat post assembly 224 has a pressure system (e.g., a pneumatic pressure system). A compressible fluid or gas, such as air, is contained within a fluid volume of the pneumatic pressure system. In one embodiment, the fluid volume includes the compressible fluid or gas and an incompressible fluid. In such an embodiment, the fluid volume may be majority or primarily (e.g., greater than 80 percent by volume) compressible fluid or gas. In another embodiment, the fluid volume includes at least a majority incompressible fluid.

Figure 28:
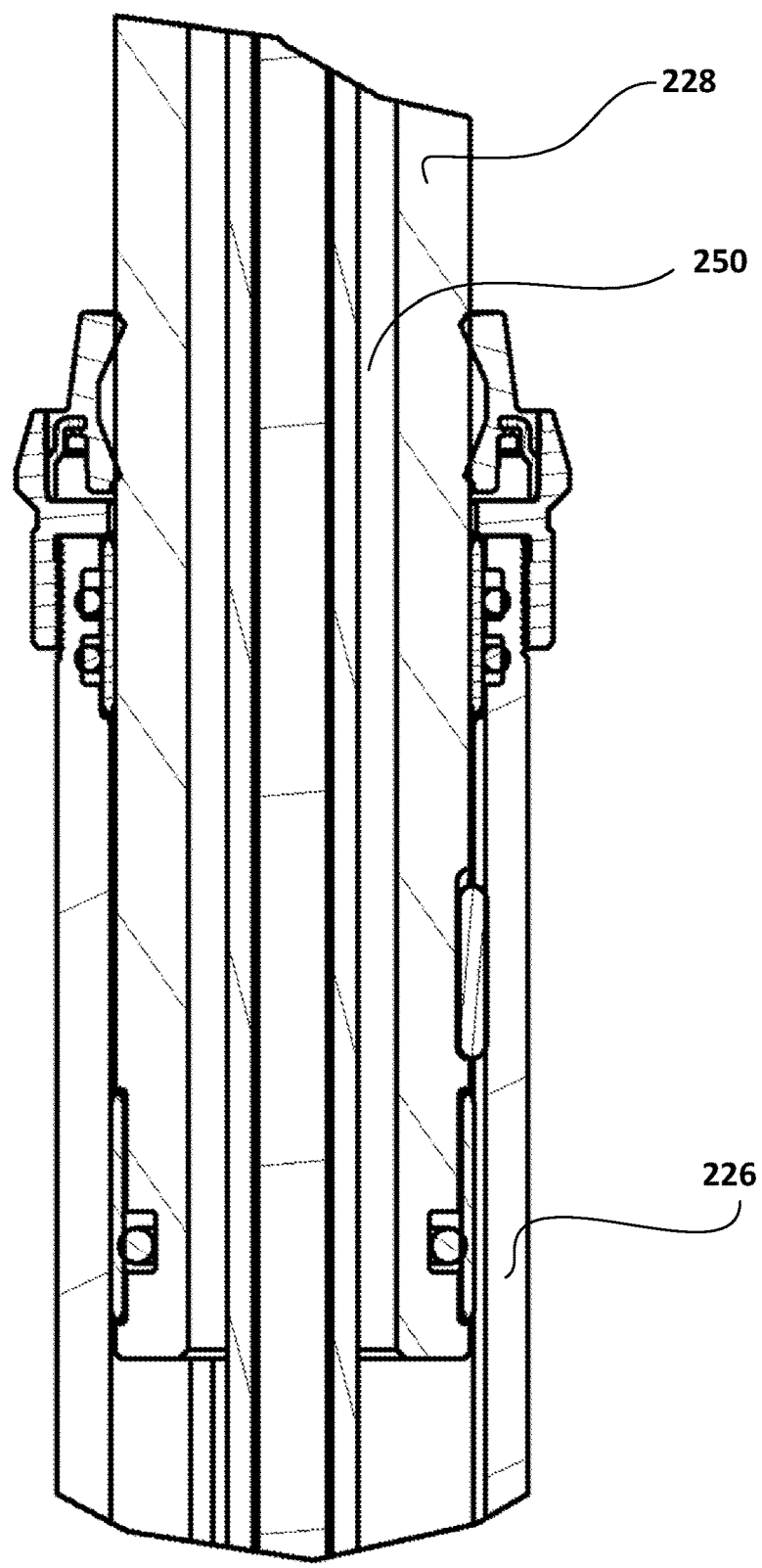
FIG. 28 is close-up view B of the side cross-section of the second seat post assembly of FIG. 26.

Referring to FIGS. 26, 28, and 29, a first pneumatic chamber 246 (e.g., the positive pressure chamber) is disposed in the lower tube 226, a second pneumatic chamber 248 (e.g., the negative pressure chamber) is disposed within the lower tube 226, and a third pneumatic chamber 250 (e.g., a residual pressure chamber) is disposed within the lower tube 226 and the upper tube 228.

The first pneumatic chamber 246 includes a volume within the lower tube 226, between the end cap 258 and the piston head 254 of the piston 252 (e.g., a side of the piston head 254 facing the end cap 258). The second pneumatic chamber 248 includes a volume within the lower tube 226, between the seal head 242 and the piston head 254 of the piston 252 (e.g., a side of the piston head 254 facing away from the end cap 258). In other words, the first pneumatic chamber 246 and the second pneumatic chamber 248 are disposed within the lower tube 226 and separated by the piston head 254 of the piston 252. The third pneumatic chamber 250 includes a volume within the lower tube 226 and the upper tube 228, around the piston shaft 255, and between the seal head 242 and the head 234.

Referring to FIG. 29, the piston 252 includes a valve 264 (e.g., an actuator valve with an isolator; a poppet) that is disposed within the piston head 254 and the piston shaft 255. A portion of the actuator valve 264 (e.g., the isolator) is movable relative to the piston head 254 and the piston shaft 255 between an open position and a closed position. The first pneumatic chamber 246 and the second pneumatic chamber 248 are fluidly coupleable via the actuator valve 264. For example, the first pneumatic chamber 246 and the second pneumatic chamber 248 are fluidly coupled when the actuator valve 264 is open, and the first pneumatic chamber 246 and the second pneumatic chamber 248 are not fluidly coupled when the actuator valve 264 is closed.

Referring to FIG. 30, the valve 264 extends through the boss 239 and into the head 234. The seat post assembly 224 may include an electronics module 280. In the example shown, the electronics module 280 is incorporated as a part of the head 234. In other embodiments, the electronics module 280 is incorporated as part of the end cap 258. The electronics module is configured to receive wireless signals from a wireless actuator that is mounted to, for example, the handlebars 104. The wireless actuator is configured to operate the electronics module to open or close, for example, an isolator of the actuator valve 264. To do so, a transmission signal is initiated by a rider by using an actuator of some type, such as a lever or a button, on the wireless actuator.

In the example shown in FIG. 30, the electronics module 280 includes a power source 282 (e.g., a battery) and a motor 284. The motor 284 is powered by the battery 282 to drive one or more components (e.g., one or more actuators 285a, 285b, and 285c) to open or close the actuator valve 264. In one embodiment, the electronics module 280 or another electronics module adjusts the top out height of the seat post assembly 124 or the seat post assembly 224.

The piston 252 (e.g., the piston head 254 and the piston shaft 255), the upper tube 228, and the head 234 are essentially positionally fixed relative to one another due to both the piston shaft 255 and the upper tube 228 being threadably connected to the head 234. The piston 252, the upper tube 228, and the head 234 are thus constrained to not move relative to each other. The seal head 242 is movable (e.g., rotatable and translatable) relative to the lower tube 226 via the threaded connection between the outer portion 240 of the seal head 242 and the inner surface 238 of the lower tube 228.

Figure 25:
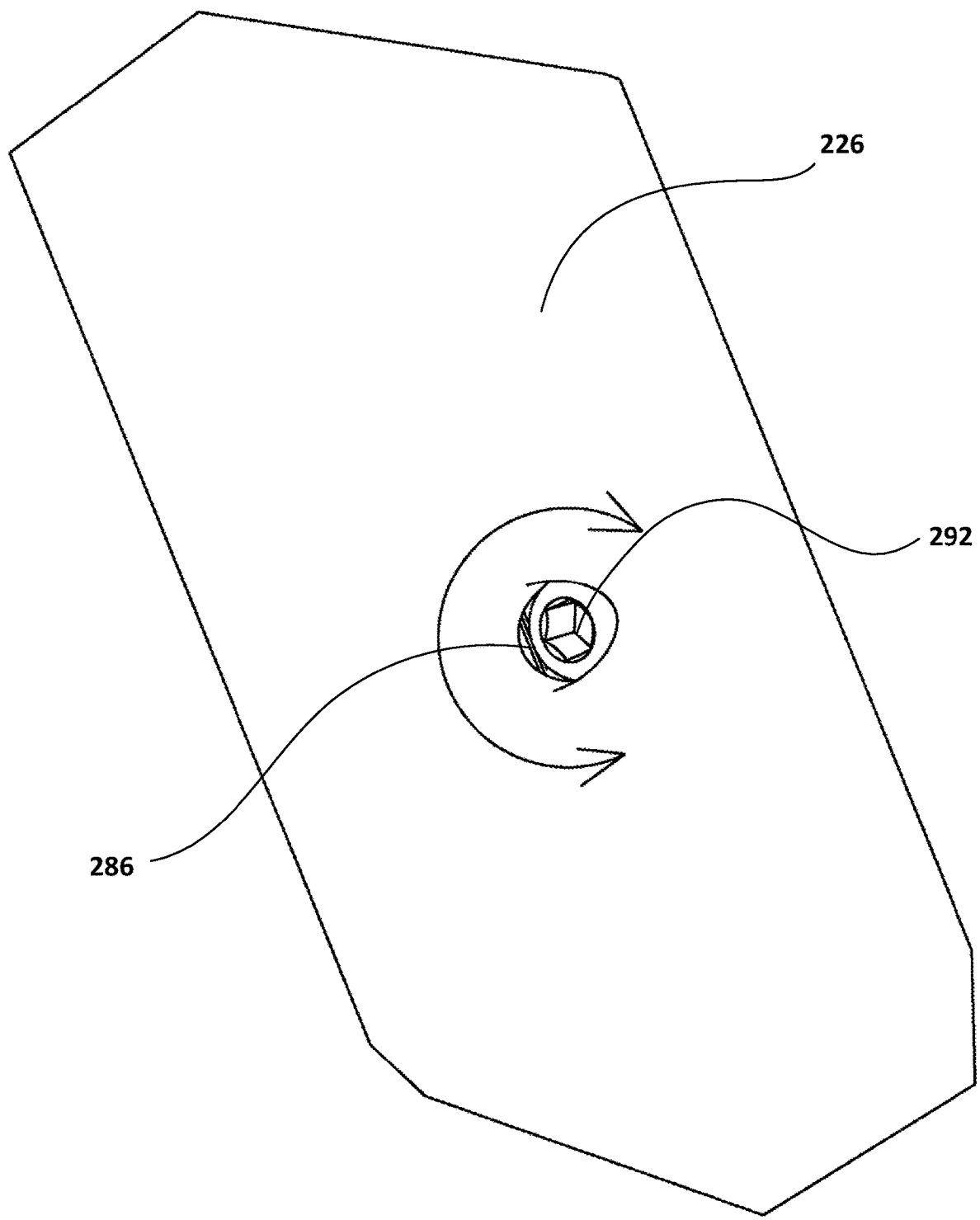
FIG. 25 is close-up view A of the perspective view of the second seat post assembly of FIG. 24.

Referring to FIG. 29, the seat post assembly 224 includes a gear 286 (e.g., a worm gear) that interacts with an outer surface 288 of the seal head 242. The outer surface 288 of the seal head 242 includes, for example, pinion gear teeth 290 that interact with the worm gear 286. Referring to FIGS. 24 and 25, the worm gear 286 is supported by the lower tube 226 and is rotatable relative to the lower tube 226 via, for example, a shaft that extends through the lower tube 226. In one example, an end of the shaft extends through the lower tube 226, and the shaft is a hex shaft or capped with a hex cap nut 292, such that the worm gear 286 may be turned with common tools.

The top out height of the seat post assembly is adjustable with rotation of the worm gear 286 (e.g., via the hex shaft or the hex cap nut 292). As the worm gear 286 is rotated, the interaction of the worm gear 286 with the pinion gear teeth 290 on the outer surface 288 of the seal head 242 causes the seal head 242 to rotate relative to the lower tube 226 via the threaded connection between the threaded outer portion 240 of the seal head 242 and the inner surface 238 of the lower tube 228. The rotation of the seal head 242 relative to the lower tube 226 causes an axial translation of the seal head 242 relative to the lower tube 226. The worm gear 286 may be rotated in a first direction (e.g., clockwise) to cause axial translation of the seal head 242 towards the end cap 258 and may be rotated in a second direction that is opposite the first direction (e.g., counterclockwise) to cause axial translation of the seal head 242 away from the end cap 258.

The piston head 254 abuts the seal head 242 when the seat post assembly 224 is in the fully extended position. The axial translation of the seal head 242 towards the end cap 258 in response to the rotation of the worm gear 286 thus causes the piston head 254 to also translate axially towards the end cap 258. Due to the piston 252, the upper tube 228, and the head 234 being essentially positionally fixed relative to one another, the axial translation of the piston head 254 towards the end cap 258 causes the upper tube 228 and the head 234 to also move towards the end cap 258. The top out height of the seat post assembly 224 is thus adjusted.

Although certain seat post assemblies, bicycles, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A seat post assembly for a bicycle, the seat post assembly comprising:
   a first tube having a first distal end;
   a second tube having a second distal end, the first tube being movable relative to the second tube to establish a distance between the first distal end of the first tube and the second distal end of the second tube along a tube axis, the distance between the first distal end of the first tube and the second distal end of the second tube being at a maximum distance when the first tube is in a first position relative to the second tube, and the distance between the first distal end of the first tube and the second distal end of the second tube being at a minimum when the first tube is in a second position relative to the second tube;
   a seal disposed within the second tube, the seal being connected to the first tube or the second tube;
   a piston that is coupled to the seal when the first tube is in the first position relative to the second tube,
   wherein a position of the seal relative to the second distal end of the second tube is adjustable, such that the first position of the first tube relative to the second tube is adjustable via the coupling between the piston and the seal.

2. The seat post assembly of claim 1, further comprising an actuator configured to adjust the position of the seal relative to the second distal end of the second tube.

3. The seat post assembly of claim 2, wherein the seal is a seal head, the seal head being connected to and positionally fixed relative to the first tube.

4. The seat post assembly of claim 3, wherein the actuator includes an endcap configured to at least partially seal the second distal end of the second tube, and
   wherein the endcap is rotatable and translatable relative to the second tube via a threaded connection of the endcap to the second tube.

5. The seat post assembly of claim 4, wherein the piston includes a piston head and a piston shaft,
   wherein the piston shaft extends through the seal head and connects the piston head to the endcap, such that the endcap and the piston head are on opposite sides of the seal head, and
   wherein the endcap and the piston head are configured to rotate and translate together.

6. The seat post assembly of claim 5, wherein the piston is coupled to the seal when the first tube is in the first position relative to the second tube via contact between a surface of the piston head and a surface of the seal head, or
   wherein the seat post assembly further comprises a bumper disposed between the piston head and the seal head, and the piston is coupled to the seal when the first tube is in the first position relative to the second tube via the bumper, such that the seal head and the piston head are in contact with opposite sides of the bumper, respectively.

7. The seat post assembly of claim 6, wherein when the first tube is in the first position relative to the second tube, the endcap and the piston are rotatable relative to the second tube via the threaded connection in a first rotational direction, such that the endcap and the piston translate in a first translational direction and, via the coupling of the piston to the seal, the seal and the first distal end of the first tube translate towards the second distal end of the second tube, and
   wherein the translation of the first distal end of the first tube towards the second distal end of the second tube adjusts the first position of the first tube relative to the second tube, such that the maximum distance between the first distal end of the first tube and the second distal end of the second tube decreases.

8. The seat post assembly of claim 7, wherein when the first tube is in the first position relative to the second tube, the endcap and the piston are rotatable relative to the second tube via the threaded connection in a second rotational direction, such that the endcap and the piston translate in a second translational direction and, via the coupling of the piston to the seal, the seal and the first distal end of the first tube are allowed to translate away from the second distal end of the second tube, the second rotational direction being opposite the first rotational direction and the second translational direction being opposite the first translational direction, and
   wherein the translation of the first distal end of the first tube away from the second distal end of the second tube adjusts the first position of the first tube relative to the second tube, such that the maximum distance between the first distal end of the first tube and the second distal end of the second tube increases.

9. The seat post assembly of claim 7, further comprising:
one or more first anti-rotation features of the first tube; and
one or more second anti-rotation features of the second tube,
wherein the one or more first anti-rotation features and the one or more second anti-rotation features are configured to interact with each other, respectively, such that the first tube is translatable but not rotatable relative to the second tube.

10. The seat post assembly of claim 2, wherein the seal is a seal head, the seal head being rotatable and translatable relative to the second tube via a threaded connection of the seal head to the second tube.

11. The seat post assembly of claim 10, further comprising a seatpost head to which a seat is attachable, the seatpost head being configured to at least partially seal the first distal end of the first tube,
wherein the seatpost head is positionally fixed relative to the first tube.

12. The seat post assembly of claim 11, wherein the piston includes a piston head and a piston shaft,
wherein the piston shaft extends through the seal head and connects the piston head to the seatpost head, such that the seatpost head and the piston head are on opposite sides of the seal head, and
wherein the piston is positionally fixed relative to the first tube and the seatpost head.

13. The seatpost assembly of claim 12, wherein the actuator includes a gear supported by the second tube, and
wherein the gear is configured to interact with an outer surface of the seal head, such that rotation of the gear relative to the second tube causes, via the interaction of the gear with the outer surface of the seal head, rotation and translation of the seal head relative to the second tube via the threaded connection.

14. The seatpost assembly of claim 13, wherein the outer surface of the seal head includes pinion gear teeth, and the gear is a worm gear configured to interact with the pinion gear teeth of the seal head.

15. The seatpost assembly of claim 14, wherein the second tube has an opening through a wall of the second tube, and
wherein the worm gear has a shaft that extends through the opening through the wall of the second tube, such that the worm gear is rotatable from outside the second tube.

16. The seatpost assembly of claim 13, wherein when the first tube is in the first position relative to the second tube, the gear is rotatable relative to the second tube in a first rotational direction, such that, via the interaction of the gear with the outer surface of the seal head, the seal head translates in a first translational direction relative to the second tube and, via the coupling of the piston to the seal, the first distal end of the first tube translates towards the second distal end of the second tube, and
wherein the translation of the first distal end of the first tube towards the second distal end of the second tube adjusts the first position of the first tube relative to the second tube, such that the maximum distance between the first distal end of the first tube and the second distal end of the second tube decreases.

17. A seat post assembly for a bicycle, the seat post assembly comprising:
a first tube having a first distal end;
a second tube having a second distal end, the first tube being movable relative to the second tube to establish a distance between the first distal end of the first tube and the second distal end of the second tube along a tube axis, the distance between the first distal end of the first tube and the second distal end of the second tube being at a maximum distance when the first tube is in a first position relative to the second tube, and the distance between the first distal end of the first tube and the second distal end of the second tube being at a minimum when the first tube is in a second position relative to the second tube;
a seal disposed within the second tube, the seal being connected to the first tube or the second tube;
a piston that is coupled to the seal when the first tube is in the first position relative to the second tube; and
an actuator supported by and rotatable relative to the second tube, the actuator being configured to adjust a position of the seal relative to the second distal end of the second tube, such that the first position of the first tube relative to the second tube is adjustable via the coupling between the piston and the seal.

18. The seat post assembly of claim 17, wherein the actuator includes an endcap configured to at least partially seal the second distal end of the second tube,
wherein the endcap is rotatable and translatable relative to the second tube via a threaded connection of the endcap to the second tube,
wherein the piston includes a piston head and a piston shaft, the piston shaft extending through the seal and connecting the piston head to the endcap, such that the endcap and the piston head are on opposite sides of the seal, and the endcap and the piston head rotate and translate together,
wherein when the first tube is in the first position relative to the second tube, the endcap and the piston are rotatable relative to the second tube via the threaded connection in a first rotational direction, such that the endcap and the piston translate in a first translational direction and, via the coupling of the piston to the seal, the first distal end of the first tube translates towards the second distal end of the second tube, and
wherein the translation of the first distal end of the first tube towards the second distal end of the second tube adjusts the first position of the first tube relative to the second tube, such that the maximum distance between the first distal end of the first tube and the second distal end of the second tube decreases.

19. The seat post assembly of claim 17, wherein the seal is rotatable and translatable relative to the second tube via a threaded connection of the seal to the second tube,
wherein the seat post assembly further comprises a seatpost head configured to at least partially seal the first distal end of the first tube, the seatpost head being positionally fixed relative to the first tube,
wherein the piston includes a piston head and a piston shaft, the piston shaft extending through the seal and connecting the piston head to the seatpost head, such that the seatpost head and the piston head are on opposite sides of the seal, the piston being positionally fixed relative to the first tube and the seatpost head,
wherein the actuator includes a gear supported by the second tube, the gear being configured to interact with an outer surface of the seal, such that rotation of the gear relative to the second tube causes, via the interaction of the gear with the outer surface of the seal, rotation and translation of the seal relative to the second tube via the threaded connection, wherein when the first tube is in the first position relative to the second tube, the gear is rotatable relative to the second tube in a first rotational direction, such that, via the interaction of the gear with the outer surface of the seal, the seal translates in a first translational direction relative to the second tube and, via the coupling of the piston to the seal, the first distal end of the first tube translates towards the second distal end of the second tube, and wherein the translation of the first distal end of the first tube towards the second distal end of the second tube adjusts the first position of the first tube relative to the second tube, such that the maximum distance between the first distal end of the first tube and the second distal end of the second tube decreases.

20. A seat post assembly for a bicycle, the seat post assembly comprising:
  a first tube having a first distal end;
  a second tube having a second distal end, the first tube being movable relative to the second tube to establish a distance between the first distal end of the first tube and the second distal end of the second tube along a tube axis, the distance between the first distal end of the first tube and the second distal end of the second tube being at a maximum distance when the first tube is in a first position relative to the second tube, and the distance between the first distal end of the first tube and the second distal end of the second tube being at a minimum when the first tube is in a second position relative to the second tube;
  a seal disposed within the second tube, the seal being connected to the first tube;
  a piston that is coupled to the seal when the first tube is in the first position relative to the second tube, wherein the piston includes a piston head and a piston shaft; and
  an actuator including an endcap configured to at least partially seal the second distal end of the second tube, the endcap being rotatable and translatable relative to the second tube via a threaded connection of the endcap to the second tube, wherein the piston shaft extends through the seal and connects the piston head to the endcap, such that the endcap and the piston head are on opposite sides of the seal, and the endcap and the piston head rotate and translate together, wherein when the first tube is in the first position relative to the second tube, the endcap and the piston are rotatable relative to the second tube via the threaded connection in a first rotational direction, such that the endcap and the piston translate in a first translational direction and, via the coupling of the piston to the seal, the first distal end of the first tube translates towards the second distal end of the second tube, and wherein the translation of the first distal end of the first tube towards the second distal end of the second tube adjusts the first position of the first tube relative to the second tube, such that the maximum distance between the first distal end of the first tube and the second distal end of the second tube decreases.

\* \* \* \* \*